United States Patent [19]
Thivet

[11] Patent Number: 5,928,539
[45] Date of Patent: Jul. 27, 1999

[54] CIGAR LIGHTER WITH LOCKING MEANS, ESPECIALLY FOR MOTOR VEHICLES

[75] Inventor: Gilles Thivet, Labruguiere, France

[73] Assignee: Valeo Vision, Bobigny, France

[21] Appl. No.: 09/003,379

[22] Filed: Jan. 6, 1998

[30] Foreign Application Priority Data

Jan. 6, 1997 [FR] France .................................. 97 00062

[51] Int. Cl.⁶ ............................................... F23Q 7/22
[52] U.S. Cl. ........................................ 219/267; 219/265
[58] Field of Search .................................. 219/267, 265, 219/240, 241, 270, 268, 262; 439/668; 362/92, 109, 32

[56] References Cited

U.S. PATENT DOCUMENTS

| | | |
|---|---|---|
| 4,079,242 | 3/1978 | Seibel . |
| 4,713,733 | 12/1987 | Fitz et al. . |
| 5,029,048 | 7/1991 | Gaisberg et al. .......................... 362/32 |
| 5,493,098 | 2/1996 | Diederich ................................ 219/265 |
| 5,780,813 | 7/1998 | Sire et al. ................................ 219/265 |
| 5,796,073 | 8/1998 | Mattis et al. ............................ 219/265 |
| 5,826,967 | 10/1998 | Mathieu .................................... 362/92 |
| 5,831,246 | 11/1998 | Thivet ..................................... 219/265 |

FOREIGN PATENT DOCUMENTS 2 436 939  4/1980  France .
2 630 057  10/1989  France .

OTHER PUBLICATIONS

French Search Report dated Oct. 20, 1997.

*Primary Examiner*—Teresa Walberg
*Assistant Examiner*—Vinod D Patel
*Attorney, Agent, or Firm*—Morgan & Finnegan, LLP

[57] ABSTRACT

A motor vehicle cigar lighter has an illuminating sleeve carrying an illuminating module which includes a light source and which surrounds the lighter socket or body. A connecting module is fixed to the rear of the lighter body. Temporary locking means, comprising tongues, are interposed between the connecting module and the illuminating sleeve.

23 Claims, 13 Drawing Sheets

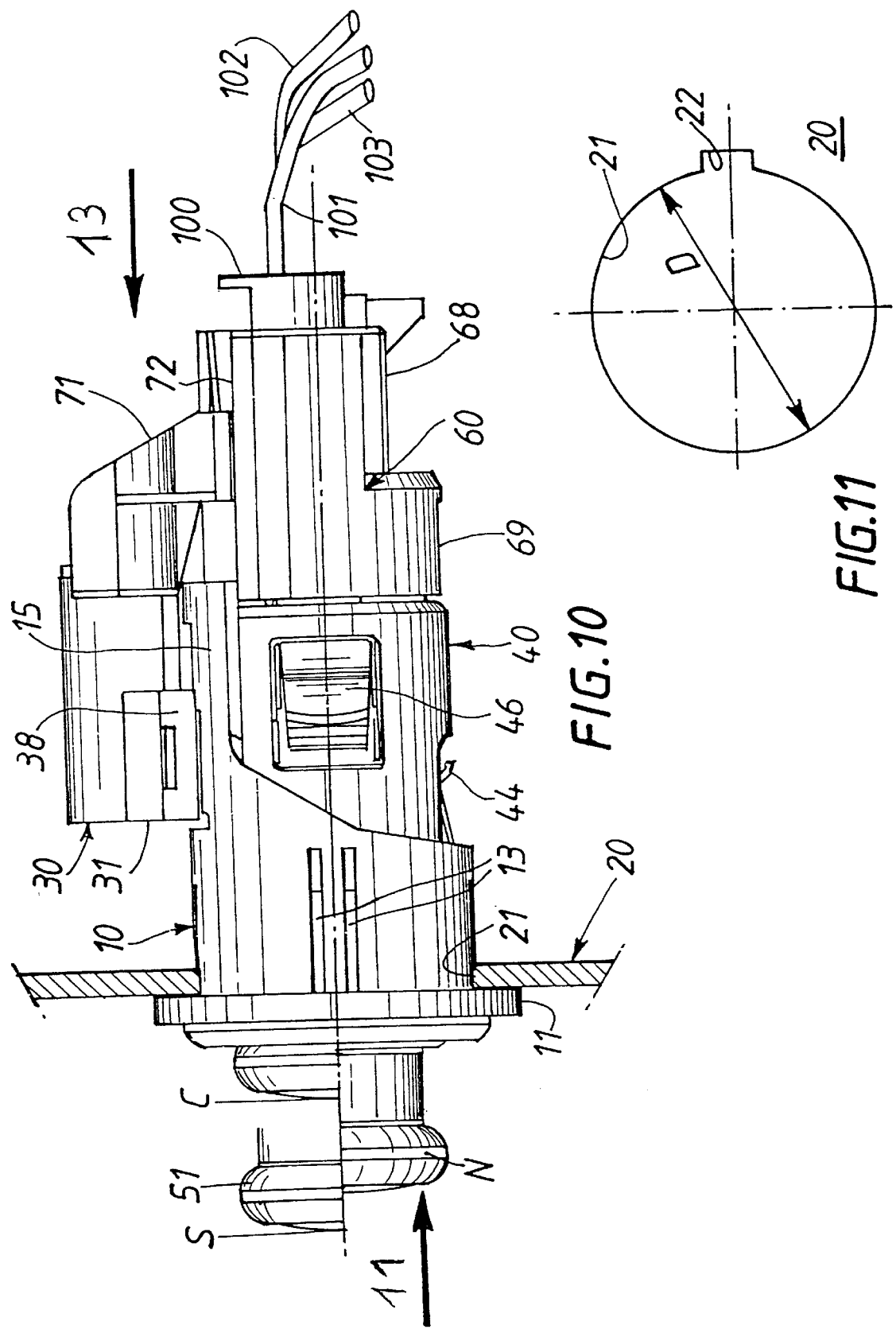

CIGAR LIGHTER WITH LOCKING MEANS, ESPECIALLY FOR MOTOR VEHICLES

FIELD OF THE INVENTION

The present invention relates to cigar lighters, especially for motor vehicles.

BACKGROUND OF THE INVENTION

A motor vehicle cigar lighter is described for example in French patent specification No. FR 2 630 057 A, and comprises a removable heating plug, for the purpose of lighting a cigar or a cigarette, together with a lighter body which receives the removable plug and supplies power to the latter for heating it, an illuminating sleeve which surrounds the lighter body, an illuminating module carried by and projecting from the illuminating sleeve, a connection module fixed on the lighter body for making the electrical connections to supply power to the lighter body, and locking means for connecting the illuminating sleeve to a fixed wall of the vehicle. The illuminating sleeve is arranged to be lit at night, so as to mark the position of the cigar lighter, the light source for this illumination being contained in the illuminating module.

Fitting of such a cigar lighter in the fixed wall of the vehicle is carried out in a series of operations. In a first of these operations, the illuminating sleeve is mounted on the fixed wall, and then, in a second operation, the lighter body is inserted from the front of the fixed wall (i.e. from the side facing into the cabin of the vehicle), so as to insert the lighter body into the illuminating sleeve and to proceed with the locking operation. This does not of course take account of the presence of the illuminating module, which can be fitted, from behind the fixed wall, on the illuminating sleeve after the latter has been fitted on the wall. In practice, the connector for the lamp is connected on the illuminating module prior to the first operation, while the electrical connection of the connecting module (supplying power to the cigar lighter itself) is carried out between the first and second operations.

The locking means, whereby the illuminating sleeve is locked on the fixed wall, comprises locking tongues which are deployable radially and which include radially outwardly projecting lugs for gripping the fixed wall between a terminal collar portion of the illuminating sleeve and the axially oriented tongues, which are formed with lugs and project from the illuminating sleeve.

In order to reduce the number of operations in the fitting of the cigar lighter in place, it is possible to extend the length of the illuminating sleeve towards the rear, so that the latter will be integral with the connecting module. In that case, the light source can be disposed at the rear, in the connecting module, so that the need for a radially projecting illuminating module is avoided. With this arrangement, the cigar lighter is delivered to the vehicle manufacturer as a unit, and may be fitted from the front of the fixed wall in a single operation, although this is of course carried out after the electrical connections have been made. Such electrical connections can be made automatically.

This solution does however call for serious modification of the cigar lighter, and in particular the illuminating sleeve and the illuminating module. It is therefore only possible to achieve such an arrangement with the use of comparatively expensive non-standard components.

DISCUSSION OF THE INVENTION

An object of the present invention is to overcome the above disadvantage in a simple and inexpensive way, while benefiting from fitting of the cigar lighter as a single unit on the fixed wall from the front.

A consequent object of the invention is to use an illuminating sleeve of simple form in association with a radially projecting illuminating module, while at the same time preserving the benefit of fitting the cigar lighter as a unit on the fixed wall from the front.

According to the invention, a cigar lighter, especially for a motor vehicle, comprises a lighter body serving as a receptacle for a removable heating plug, an illuminating sleeve surrounding the lighter body for fastening the latter on a fixed wall, an illuminating module carried by the illuminating sleeve for supplying light to the latter, a connecting module fixed on the lighter body for the electrical power supply of the lighter body, and locking means for connecting the illuminating sleeve to a said fixed wall, in which the said locking means comprise an axially oriented locking tongue, is wherein in that temporary locking means are interposed between the illuminating sleeve and the connecting module, for effecting a withdrawable temporary connection between the illuminating sleeve and the connecting module.

Thanks to the invention, the illuminating sleeve and its associated illuminating module are mounted telescopically on the assembly consisting of the lighter body and the connecting module. The cigar lighter is delivered to the vehicle manufacturer in a deployed condition. In this delivery condition, the illuminating sleeve with its illuminating module is connected to the connecting module by the temporary locking means. The illuminating sleeve is pre-fitted on the connecting module. It is therefore spaced away from the free end of the lighter body and projects axially with respect to the connecting module, in a direction away from the free end of the lighter body. The illuminating sleeve is then disposed close to the base of the lighter body, and is held in place by the temporary locking means.

During fitting of the cigar lighter on the fixed wall, from the front as mentioned above, the first step is to make the electrical connection of the connecting module, and more precisely the electrical power supply connector on the connecting module, which is configured accordingly. This connection is easy to make because the illuminating sleeve is still not fixed to the fixed wall of the vehicle: it is carried out by extracting the electrical power supply connector.

Then, with the cigar lighter in its deployed condition, the illuminating module is introduced obliquely into the mounting hole in the fixed wall, after which the cigar lighter is straightened up, so that the fixed wall can be inserted between the terminal collar portion of the illuminating sleeve and the illuminating module. Finally, the lighter body is pushed back so as to cause the locking tongue to be urged by relative telescopic movement from its temporary locking position to its final position, in which it locks the illuminating sleeve directly on the fixed wall. In this way, the locking tongue, in the lighter of the invention, occupies two successive positions.

It will be appreciated that the lighter body is identical to that of a standard cigar lighter.

In general terms, the configuration of the illuminating sleeve is also the same as that of a conventional illuminating sleeve. However, the lug of the locking tongue is preferably directed inwardly so as to engage with the edge of an aperture formed close to the end of the connecting body (i.e. the body of the connecting module), and adjacent to the base of the lighter body. This complementary aperture is part of the temporary locking means and is matched to the size of the lug on the locking tongue.

It will be appreciated that the form of this lug has no significant effect on the manufacture of the moulded illuminating sleeve.

Preferably, the two locking tongues are arranged as part of the temporary locking means in such a way that they finally form jaws which grip on the lighter body, so preventing the latter from being extracted. Thanks to the invention, it is therefore possible to omit the lugs which are usually present in the main part of the illuminating sleeve for penetration into the apertures in the lighter body, for the purpose of preventing the latter from being extracted. Nevertheless, it will be understood that such lugs and apertures can be retained if desired.

It is possible easily to form at least one axial groove at the inner periphery of the illuminating sleeve, and a complementary projecting element at the outer periphery of the body of the connecting module, so as to constitute a locating means which enables the illuminating sleeve to be mounted on the connecting module in an angular position which is indexed, so that the locking tongue will automatically come into engagement with its associated aperture in the connecting module, so as to effect the temporary locking provided by the invention.

The above mentioned projecting element and groove also enable the illuminating sleeve to be coupled in rotation by mating cooperation to the connecting module, in such a way that the aperture and the temporary locking means can be made wider in the circumferential direction than the lug of the locking tongue, and so that the locking tongue is protected. The projecting element may consist of an axial rib projecting from the body, which is preferably of a suitable mouldable, of the connecting module.

In preferred embodiments of the invention, this groove and projecting element are trapezoidal in form, and the axial projecting element consists of a chamfered edge formed on the body of the connecting module. The projecting element and the corresponding groove are also part of the temporary locking means and facilitate the pushing of the lighter body into the illuminating sleeve. Two grooves and two complementary ribs are preferably provided in the illuminating sleeve and on the connecting module respectively. This feature facilitates the fitting of the cigar lighter in the fixed wall from the front in the manner described above.

Accordingly, in preferred embodiments of the invention, the body of the connecting module has on its outer periphery an axially oriented slide complex. This slide complex may have at its summit an axial slide having two inclined flanks. Each of these flanks, which are for example in the form of inclined lips, serves to guide the lug of the corresponding locking tongue. This facilitates fitting of the illuminating sleeve on the connecting module, and also protects the locking tongues. The base of the slide may be open in order to give access to a connecting tongue carried by the connecting module. The illuminating module may then have a ground (or earth) tongue which is arranged to cooperate, in a manner known per se, with the lighter body and with a further tongue (a positive tongue) which is arranged to cooperate with the connecting tongue. The latter is then preferably made integral with an additional power supply tongue carried by the connecting module.

Thus, by contrast with the arrangement described in French patent specification No. FR 2 630 057 A, only one electrical power supply connector need be provided; this connector is connected on the connecting module in order to supply both the lighter body and the illuminating module. Thus the electrically insulating body of the connecting module is modified from the corresponding component in the prior art, in order to envelop the power supply tongues. However, this is no disadvantage, firstly because the body can easily be made by molding, and secondly because it enables only a single connector to be provided as mentioned above.

In addition, the electrical power supply tongues of the lighter body can readily be so configured that they constitute a high current supply socket. It is easy to offset axially and circumferentially the three electrical power supply tongues, namely the two tongues of the lighter body and the power supply tongue for the illuminating module, which is preferably narrower than the other two tongues so as to constitute a locating element. The earth tongue of the lighter body may then have the form of a half ring extended by a root portion of the axial portion of the said tongue. The other two tongues may then have a transverse base which is offset axially with respect to the half ring of the earth tongue.

In preferred embodiments of the invention, two further slide elements may be formed laterally in the above mentioned slide complex, for receiving knee elements, or knees, of the illuminating module. With this arrangement, the illuminating module is mounted on the slide complex of the connecting module for sliding movement like a drawer. During this sliding movement, the positive tongue of the illuminating module slides along its associated connecting tongue carried by the connecting module. The knee elements and slide elements enable good electrical contact to be obtained between the tongues of the illuminating module and those of the connecting module.

In addition, the illuminating module constitutes a bridge between the illuminating sleeve and the connecting module. As a result, the mechanical strength of the illuminating module is increased, and the knees and associated slide elements, which are for example in the form of grooves, also prevent the lighter body from being extracted. The illuminating module is more stable, so that its electrical power supply is improved.

In a cigar lighter according to the invention, the cigar lighter is fitted from the front of the fixed wall, in the latter, as a unit in a single operation, in which the lighter is introduced obliquely (i.e. at an angle), giving the required relative axial movement between the illuminating module and the connecting module while involving no modification of the lighter body. The inexpensive structure having an illuminating sleeve and illuminating module of standard types is thus retained. The body of the connecting module is modified in only a simple way by molding, so as to allow high values of current to be carried and to provide direct connection of the electrical power supply for the illuminating module, while guiding the illuminating sleeve and the illuminating module, and constituting a connecting bridge between the illuminating sleeve and the connecting module.

As will have been understood from the foregoing, the lugs of the locking tongues are generally in the form of a truncated pyramid for cooperation with the above mentioned slide of the connecting module.

Further features and advantages of the invention will appear more clearly on a reading of the following detailed description of a preferred embodiment of the invention, which is given by way of non-limiting example only and with reference to the accompanying drawings.

BRIEF DESCRIPTION OF THE DRAWINGS

FIG. 10 is a view similar to FIG. 9, showing the cigar lighter in its final position fitted on the fixed wall of the vehicle.

FIG. 11 is a view in the direction of the arrow 11 in FIG. 10, showing the form of the hole formed in the fixed wall for fitting of the cigar lighter therein.

DESCRIPTION OF A PREFERRED EMBODIMENT OF THE INVENTION

Figure 1:
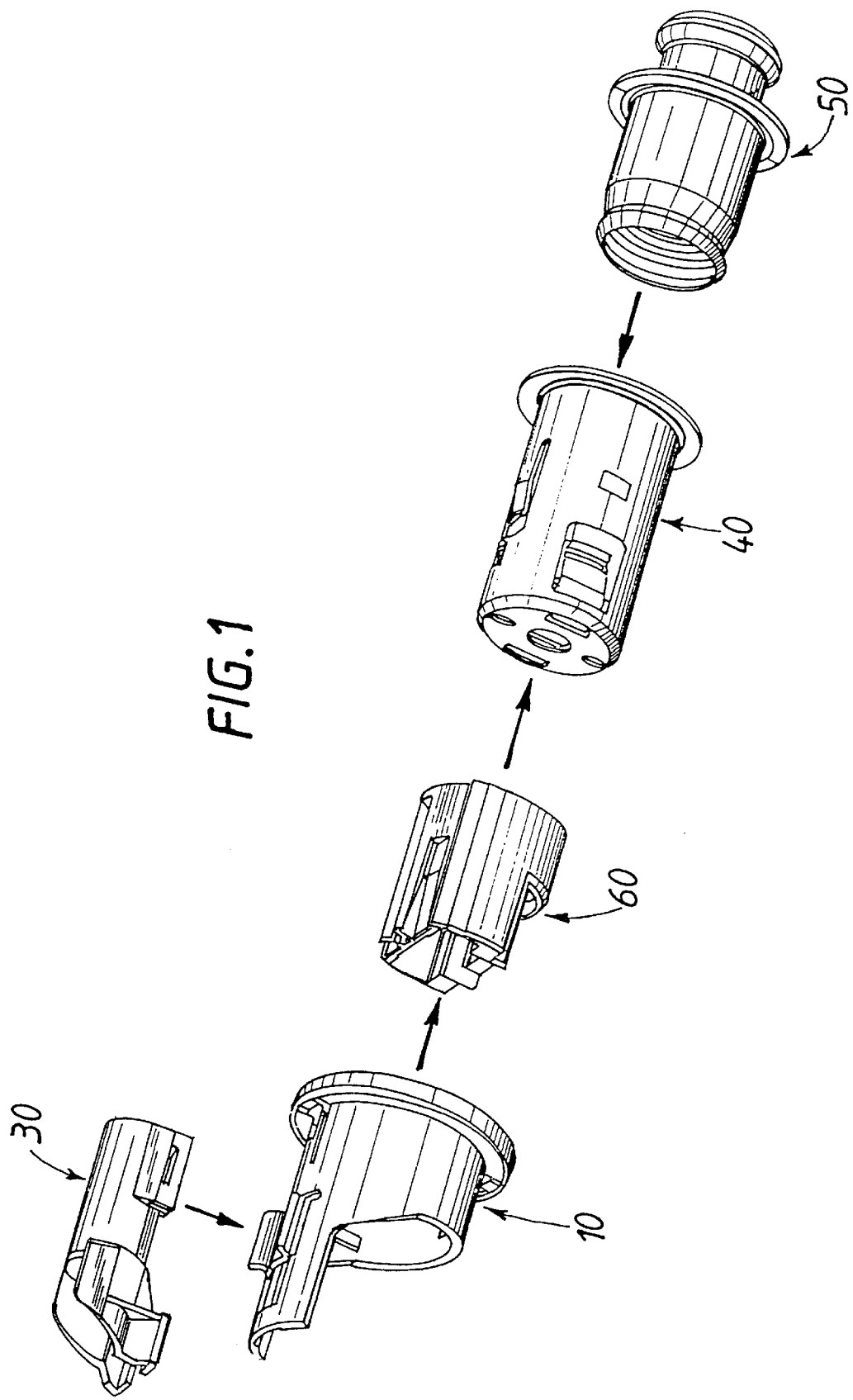
FIG. 1 is an exploded perspective view showing the five unitary sub-assemblies of which the cigar lighter in accordance with the invention consists.
Figure 2:
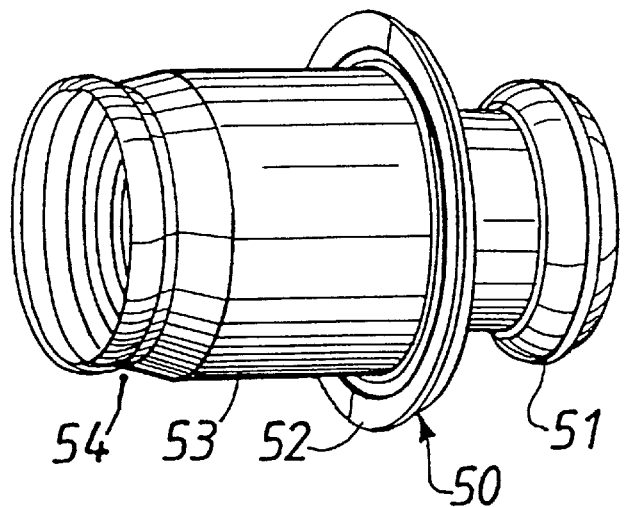
FIGS. 2 to 6 are perspective views, each showing a respective one of these five unitary sub-assemblies.

The cigar lighter shown in the drawings is designed to be delivered as a unit to the manufacturer of a motor vehicle, before fitting of the cigar lighter as a unit on a fixed wall 20 (FIG. 10) of the vehicle. This fixed wall in this example is the facial panel of the vehicle, though it may alternatively be a console. The cigar lighter unit is fitted in the wall 20 from the front of this wall, which for the purposes of this Application means the side facing into the cabin of the vehicle, so that the back of the wall 20 faces towards the front of the vehicle itself.

Figure 8:
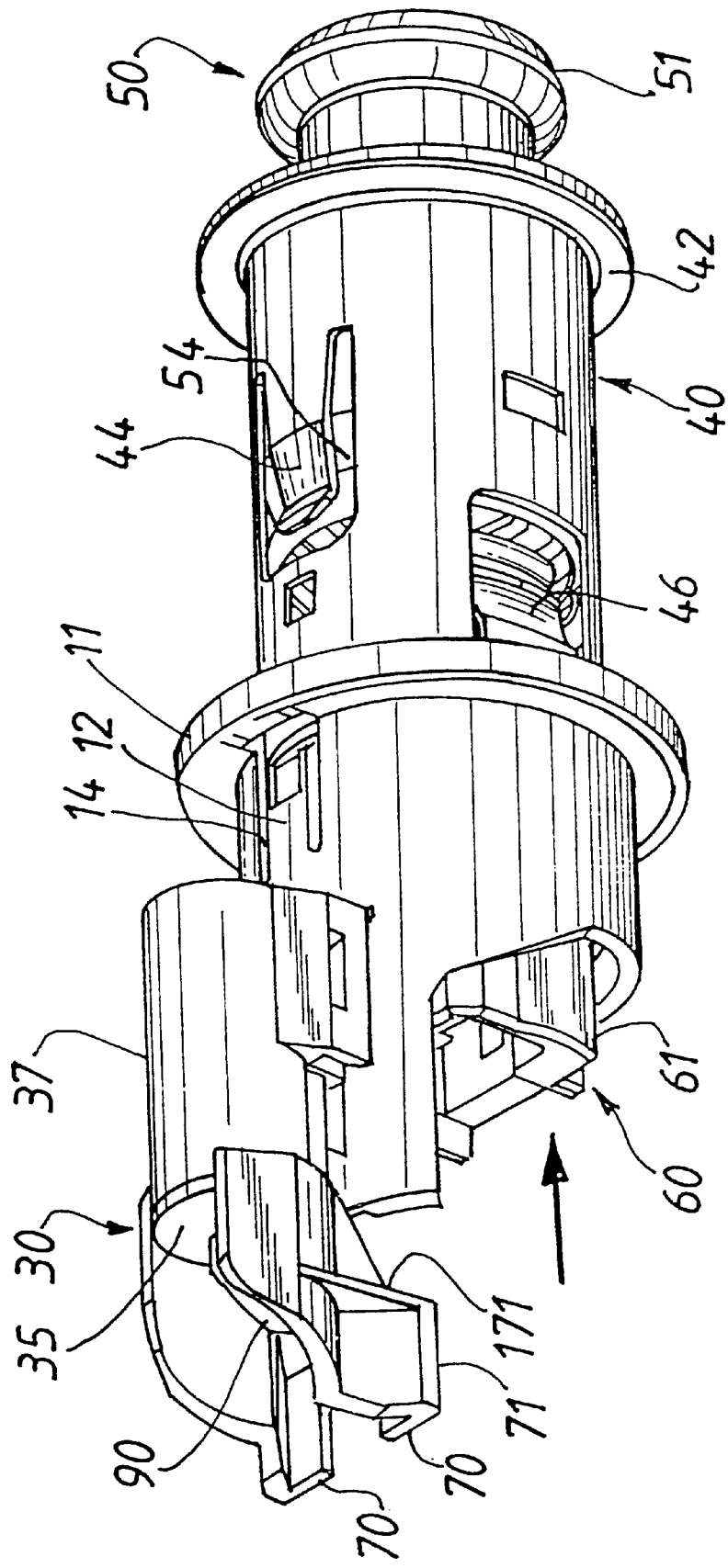
FIG. 8 is a perspective view of the cigar lighter in its condition as delivered to the motor manufacturer, that is to say prior to fitting of the cigar lighter on a fixed wall of the vehicle, the illuminating ring being pre-fitted on the connection module.
Figure 9:
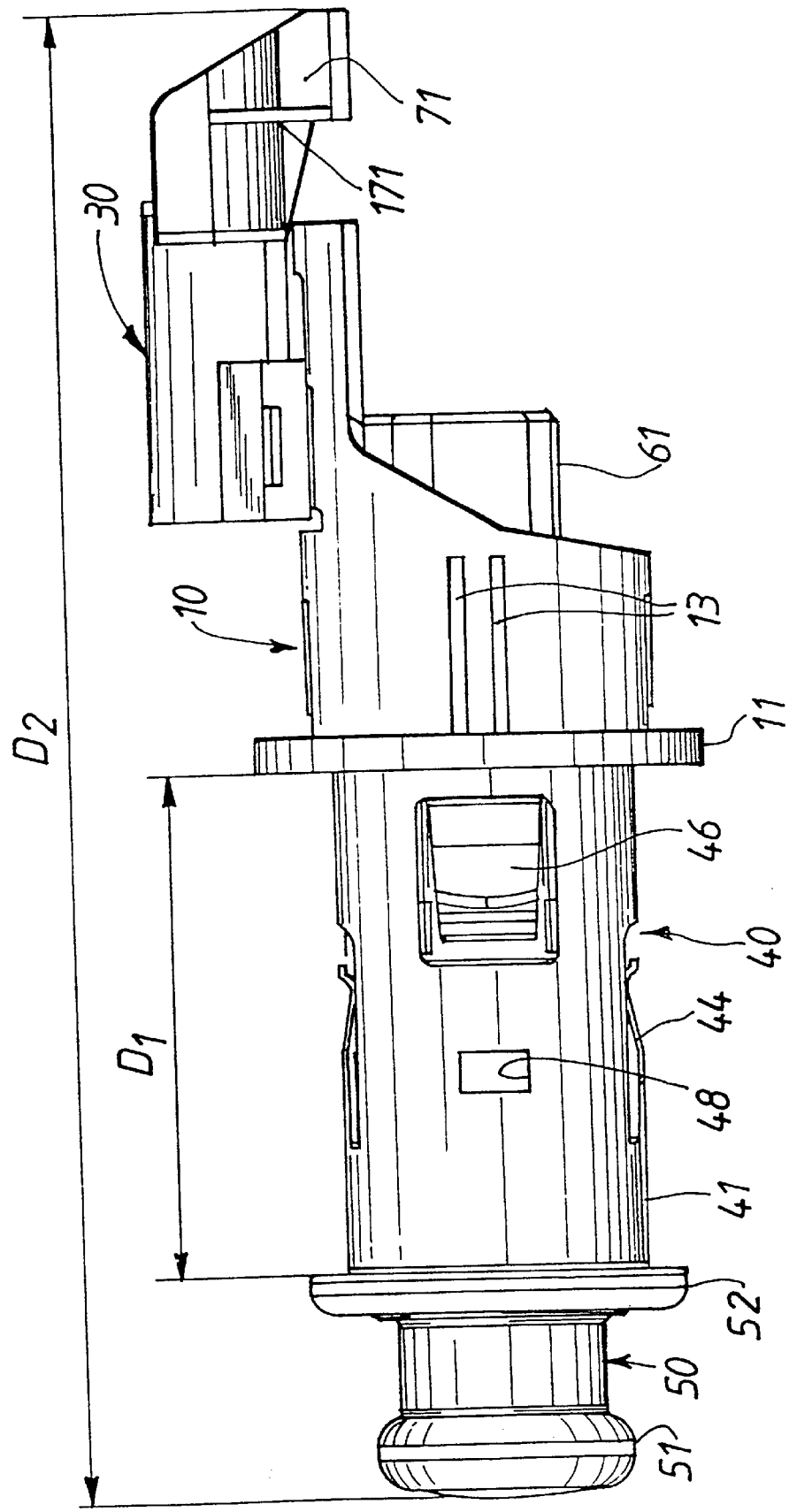
FIG. 9 is a side view of the cigar lighter of FIG. 8.

On delivery, the cigar lighter is in the deployed condition shown in FIGS. 8 and 9, whereas after being fitted on the fixed wall 20 it is in the retracted condition shown in FIG. 10. The change from the deployed condition to the retracted condition is obtained by a "swallowing" or "downsiding" effect, with relative telescopic movement, and the cigar lighter is constructed from standard components, thus minimizing its cost.

The cigar lighter comprises a lighter body 40 for receiving a removable heating plug 50, the plug 50 itself, and an illuminating sleeve 10 surrounding the lighter body 40, for fastening the lighter body 40 on the fixed wall 20 and for identifying the position of the cigar lighter at night. The lighter also includes an illuminating module 30 for supplying light to the illuminating sleeve 10, and a connecting module 60 for supplying electrical power to the lighter body 40. FIGS. 2 to 6 show the plug 50, the body 40, the connecting module 60, the illuminating sleeve 10, and the illuminating module 30, respectively.

The illuminating sleeve 1 0 carries the illuminating module 30 in such a way that the latter projects from the sleeve 10. The lighter body 40 includes a lighter sleeve element 41 which serves as the actual receptacle for the heating plug 50, and which carries an internal current supply element 46 for supplying current to the plug 50.

The connecting module 60 extends the lighter body 40 axially, and is carried by the latter. The diameters of the lighter sleeve element 41, and that of the connecting module 60, are such that the sleeve element 41 and the connecting module 60 can be fitted inside the illuminating sleeve 10.

The sleeve 10 is so configured that it leaves part of the lighter body 40 exposed, and more precisely part of the sleeve element 41 of the latter, so as to enable the cigar lighter to be introduced into the fixed wall 20 obliquely. The illuminating sleeve 10 therefore surrounds the lighter body 40 only partly, and does not completely mask the latter.

In the drawings, the cigar lighter also includes locking means 11 to 13 (see for example FIGS. 5, 8 and 9) having notched, axially oriented locking tongues 12, for securing the illuminating sleeve 10 to the fixed wall 20. Fastening means 65, 64 (see FIG. 13) are also provided, including a standard type of fastening member 65, for securing the connecting module 60 on the lighter body 40. Finally, for attaching the illuminating module 30 to the illuminating sleeve 10, attachment means 31, 34 are provided, including snap-fitting means 32, 33 (see FIGS. 5 to 7).

The cigar lighter also includes assembly means 70 to 72 for coupling the illuminating module 30 and the connecting module 60 together for rotation of one with respect to the other. The elements 70 to 72 are shown for example in FIGS. 6 and 10, and also provide proper electrical connection between these two modules.

Temporary locking means 80 to 84 (see for example FIGS. 4, 16 to 18, and 24) cause the above mentioned axial tongues 12 to give withdrawable temporary coupling of the illuminating sleeve 10 with the connecting module 60. Electrical connecting means 90 to 94 (see for example FIGS. 4, 13, 14, 18, and 23 to 25) provide electrical connection between the illuminating module 30 and the connecting module 60.

In the present embodiment, the illuminating sleeve 10, the lighter body 40, the connecting module 60 and the illuminating module 30 together constitute a cigar lighter socket, either for the removable heating plug 50, or for an accessory plug which is inserted into the lighter socket. This socket is fixed on the fixed wall 20 by means of the illuminating sleeve 10, which is made of a material which is both electrically insulating and translucent (or even transparent).

This is a moldable material, and in the present example is a coloured plastics material. The sleeve 10 surrounds the connecting module 60 in the delivery condition shown in FIGS. 8 and 9, and surrounds the lighter body 40 in the fitted or retracted position shown in FIG. 10.

Figure 5:
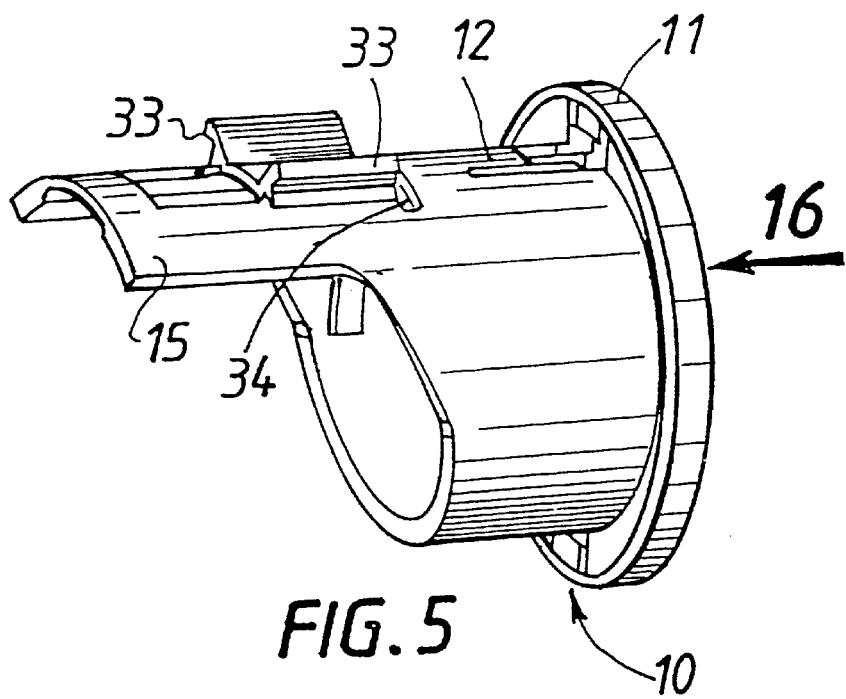

The illuminating sleeve 10 itself is of a standard type, and, as seen in FIG. 5, it has an illuminating ring 11 at its front end. This ring 11 is arranged to abut on the front face of the fixed wall 20, which has a circular hole 21 (FIGS. 10 and 11) of diameter D through which the body of the sleeve 10 is fitted. The body of the sleeve 10 has an axially projecting tail portion 15 at its rear end.

The sleeve 10 firstly surrounds most of the lighter body 40 when the lighter socket is fitted in the wall 20 (see FIG. 10), and carries the illuminating module 30 with the latter projecting with respect to the sleeve 10 as already mentioned.

Figure 17:
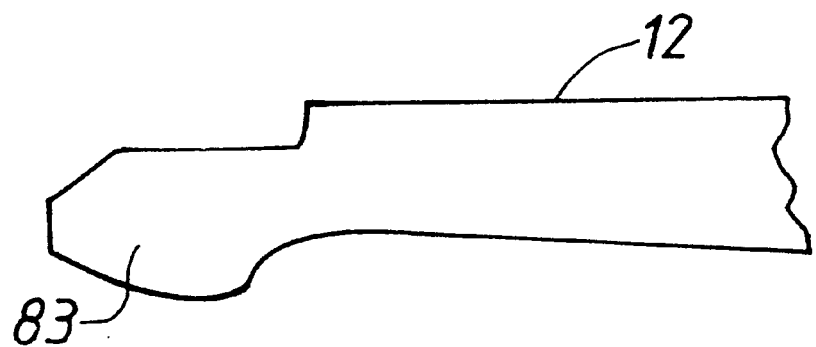
FIG. 17 is a scrap view showing one of the locking tongues.

The tongues 12 of the sleeve 10 have already been mentioned. In this example, there are two of these tongues, diametrically opposed to each other and located close to the illuminating ring 11. One of these tongues is aligned axially with the tail portion 15. The tongues 12 are formed in the molding of the sleeve 10, and are defined by generally U-shaped slots 14, see FIG. 8. The axial tongues 12 are resiliently deformable in the radial direction. In a manner known per se, they can be deployed radially so that their free ends can engage against the back face of the fixed wall 20 when the cigar lighter is fitted in the latter. The illuminating ring 11 is provided with notches, shown in FIG. 16 without a reference numeral, facing the tongues 12, so that the latter can be stripped from the mold. For this purpose, the upper surface of the free ends of these tongues is notched as shown in FIG. 17.

The sleeve 10 has, at 90 degrees with respect to the tongues 12, a locating element consisting of two parallel ribs 13, each of which is arranged to cooperate with the lateral side of a notch 22 formed in the edge of the hole 21 in the wall 20 (see FIGS. 10 and 11). These locating ribs 13 accordingly prevent the sleeve 20 from rotating with respect to the wall 20, and hold the sleeve in a predetermined angular position. The locking means 11 to 13 therefore of the illuminating ring 11 constituting a fixed axial abutment element, the locking tongues 12 and the locating ribs 13, so that the sleeve 10 is immobilised against rotation by cooperation of the locating ribs 13 with the sides of the notch 22, while it is immobilised in the axial direction by the clamping of the wall 20 between the illuminating ring 11, in contact with the front surface of the wall 20, and the deployed tongues 12, the free ends of which are then in engagement with the back of the wall 20.

The tail portion 15 of the sleeve 10 is bounded laterally, in the vicinity of its root zone where it joins the body of the sleeve 10, by two longitudinal grooves 84 (see FIG. 18), which are oriented axially and extend as far as the illuminating ring 11. The ring 11 therefore has at its inner periphery two shallow notches defined by the grooves 84, the latter being disposed circumferentially on either side of the mould stripping notch mentioned above and associated with the tongue 12. This notch is in line with the tail portion 15 (see FIG. 16 in this connection). One of the grooves 84 accordingly extends circumferentially between this tongue 12 and the ribs 13. This tongue 12 is arranged on the axial axis of symmetry of the tail portion 15.

In the diametrically opposed position, the sleeve 10 may have two very shallow thickened portions, not shown. The purpose of these thickened portions is to engage in apertures 48, FIG. 3, formed in the lighter body 40.

When the sleeve 10 is fixed on the wall 20, the tongues 12 grip the lighter body 40 between them. Means are thus formed for immobilizing the body 40 with respect to the sleeve 10, these immobilizing means comprising the tongues 12 together with the above mentioned thickened portions and the apertures 48. After the sleeve 10 has been fixed on the wall 20, these immobilising means prevent the lighter body 40 from being extracted, the lighter body being thus mounted fixedly within the sleeve 10 that extends through the wall 20.

The grooves 84 thus, together with the tongues 12, form part of the temporary locking means which act between the sleeve 10 and the connecting module 60, in a manner to be described later herein.

It will therefore be realised that the tongues 12 have a triple function, namely locking of the sleeve 10 on the wall 20, immobilization of the lighter body 40 by gripping it, and temporary locking of the sleeve 10 on the connecting module 60 before the cigar lighter is fitted to the fixed wall 20.

Figure 15:
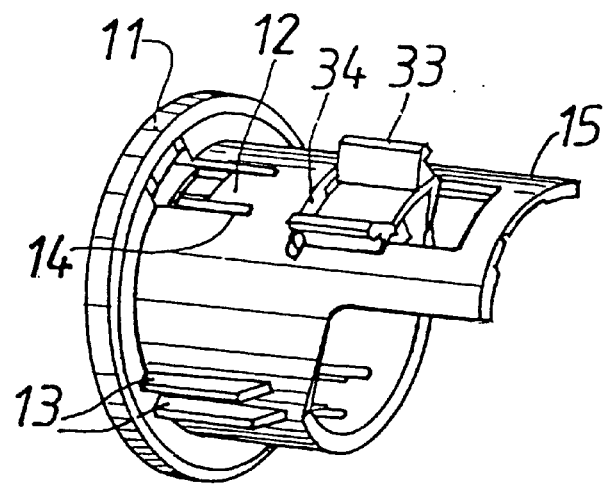
FIG. 15 is a perspective view of the illuminating ring, seen from a different angle from FIG. 5.
Figure 16:
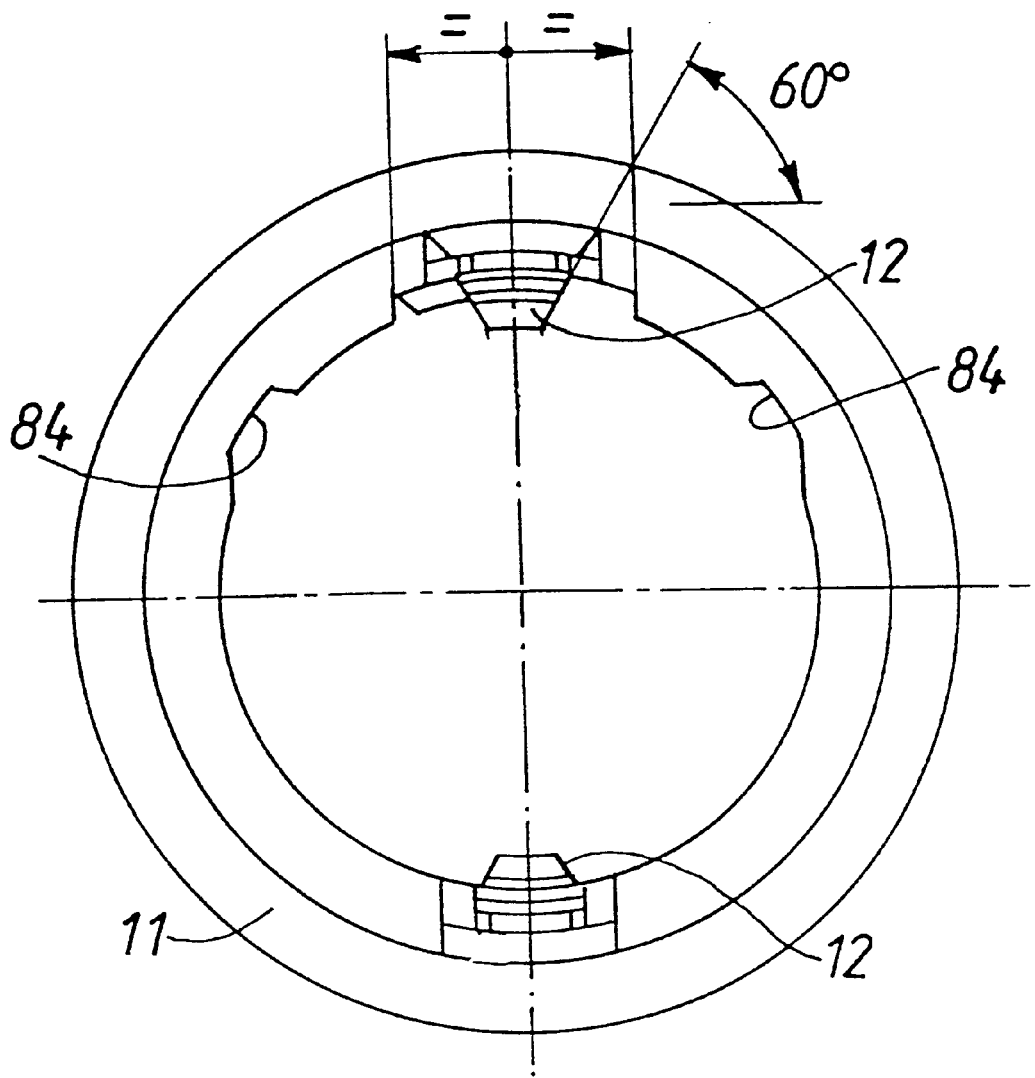
FIG. 16 is a view in the direction of the arrow 16 in FIG. 5.

The tail portion 15 partly carries the attachment means 31 to 34 mentioned above, which act between the illuminating sleeve 10 and the illuminating module 30. To this end (see FIGS. 5 and 15), the tail portion 15 has a circumferential slot 34, together with two shouldered axial lugs 33 which project radially. The lugs 33 together define an outwardly divergent slot, which is well illustrated in FIG. 5. The free ends of the lugs 33 carry an axially oriented flange, the lower surface of which, facing towards the body of the sleeve 10, defines a retaining shoulder for a lip 32 (FIG. 7) carried by a cap element 37 of the illuminating module 30, which projects with respect to the sleeve 10. The cap element 37 is of an opaque, electrically insulating molding material, which is a plastics material in this example.

Figure 6:
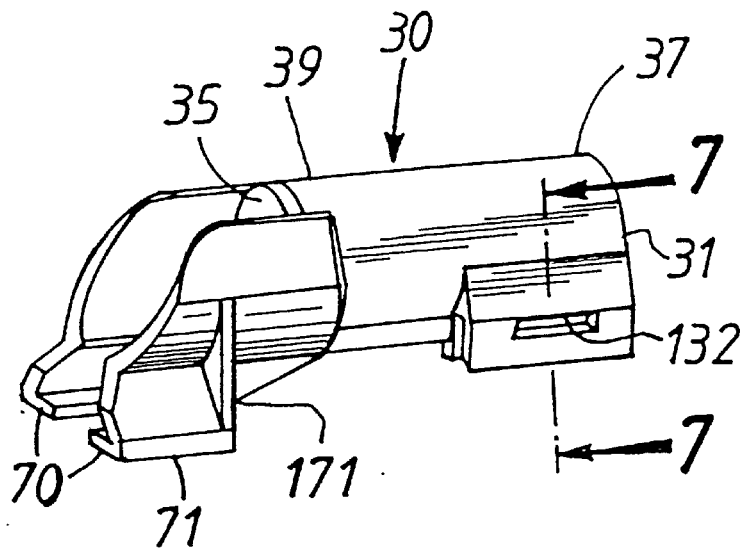
Figure 7:
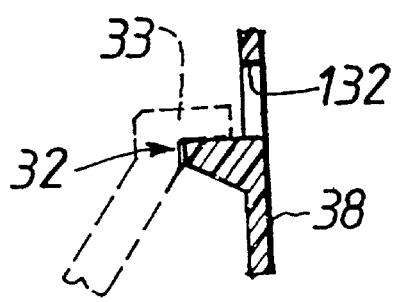
FIG. 7 is a partial view, in cross section taken on the line 7—7 in FIG. 6, with part of the axial lug associated with the illuminating ring shown in broken lines.

The molded cap element 37 includes, as seen in FIGS. 6 and 7, a front portion 31, 38, a middle portion 39, and a rear portion 71. The middle portion 39 is tubular, and contains a lamp carrier sleeve 35 which carries the cap of a light bulb 36 (FIG. 14), together with electrical connectors crimped into contact with the power supply wires for the bulb 36. The sleeve 35 is open at the front, and is closed by a base from which a fourth electrical power supply member 90 projects outwardly. The light emitting part of the bulb 36 projects out of the sleeve 35 and is contained in the hollow front portion 31, 38 of the cap element 37. This front portion is open facing towards the tail portion 15 of the sleeve 10, so that the bulb 36 is able to illuminate the tail portion 35 and the sleeve 10 in general. The front portion 31, 38 is bounded by a transverse front wall 31, the upper wall of the cap element, and two axially oriented ring elements 38 which are joined laterally to the middle portion 39.

The wall 31 is arranged to penetrate into the circumferential slot 34 in the sleeve 10, defining the lugs 33 on the front and overlapping the latter circumferentially (see FIGS. 5 and 15), so that the cap element 37 is immobilised axially, with a fitting clearance in this example, with respect to the sleeve 10. Each of the wing elements 38, which are parallel to each other, carries a respective one of the lips 32, which are formed by moulding along the edge of a through aperture 132, FIG. 7. The lips 32 are shorter in the axial direction than the shouldered lugs 33, and have a flat face for cooperation with the shoulder of the corresponding lug 33, together with an inclined face as shown in FIG. 7. The module 30 is therefore snap-fitted on the sleeve 10, with the inclined surfaces of the lips 32 enabling the lugs 33 to be offered up until the flat faces of the lips 32 come into engagement with the lower face of the flange of the lugs 33.

In this way, the module 30 is attached to the illuminating sleeve 10, and forms with the latter a unitary assembly because of the attachment means 31 to 34. This module reduces the overall fitting time of the cigar lighter, while enabling the bulb 36 to be tested in advance and to be changed easily when required, by withdrawing the sleeve 35 constituting a sub-assembly, with the bulb 36, within the cap element 37, the upper part of which may be open at the front so that the bulb 36 can also illuminate an ashtray or a power socket.

The lighter body 40 and the lighter plug 50 are both of standard types. For more details about this, reference is invited to French patent specification No. FR 2 630 057 A.

It will be recalled that the heating plug 50 comprises two parts which are movable axially with respect to each other, against the action of a helical return spring. One of these parts is in fact movable, and comprises a finger grip button 51 (FIG. 2) fixed to an insulating cap. The cap carries a support for a heater element which is mounted within an end cup element, which can be seen in broken lines in FIG. 14. The support is in the form of a sleeve with a base which carries, fixed to it by means of a rivet, the cup element and the heater element, with an insulating ring being interposed between the base and the cup element.

The fixed part of the heater plug comprises a ring 52 on which is fastened a fire shield 53, which surrounds a guide joined by molding to the ring 52. The fire shield 53 surrounds the heater element, while the guide serves for guiding the heater element support, the return spring being interposed between the base and the insulating cap. The finger grip button 51, the cap and the ring 52 are made of electrically insulating material, which is plastics material in this example. The button 51 and the said cap are also of thermally insulating material. The other components of the heating plug 50, apart from the insulating ring, are made of electrically conductive material, i.e. metal.

The heater element consists for example of a spiral-wound heating resistance contained within the end cup element. The fire shield 53 has a circumferential groove 54 which is generally V-shaped and which acts as a receptacle for two axial retaining tongues 54 (FIG. 3), diametrically opposed to each other and forming part of the lighter body 40. In this example the tongues 44 are part of the electrically conductive lighter sleeve element 41, which in this case is press-formed from sheet metal. The tongues 44 are formed in U-shaped slots of the sleeve element 41. The sleeve element has, at its open free end, a collar portion 42 which is arranged to engage on the front face of the ring portion 11 which forms part of the locking means (described earlier herein) of the illuminating sleeve 10. The notches described above and facing towards the tongues 12 (see FIG. 16) are formed in this ring portion 11, and are masked by the collar portion 42. The sleeve element 41 of the lighter body 40 has a perforated base 43 which carries the above mentioned current supply element 46 insulated from it. In this example the element 46 consists of a two-fingered clip, or pinch clip, having a U-shaped cross section with two axially oriented fingers, each of which has a retaining lip as shown best in FIG. 14. These lips are turned inwardly towards each other. In a manner known per se, the cup element of the heating resistance is arranged to be engaged with the fingers of the pinch clip 46 and to be retained by the retaining lips of these fingers, which move apart under the effect of heat.

For this reason, the sleeve element 41 is formed with apertures 47 to enable the fingers of the pinch clip 46 to be deployed outwards. A support bush 49, of a material which is both electrically and thermally insulating, and which is here a moldable plastics material, is interposed between the base 43 of the sleeve element 41 and the base of the pinch clip 46.

The pinch clip 46 is connected electrically, in a manner to be described below, to an electrical power supply member 63, while the sleeve element 41 is connected, again in a manner to be described below, to another power supply member 62. The members 62 and 63 will also be referred to as the first and second tongues respectively. The power supply member 63 also forms part of the fastening means 63, 65 mentioned earlier in this description. The first and second power supply members 62 and 63 (FIGS. 13, 14 and 18 to 24) are each arranged to be connected to a respective one of the terminals of a voltage source, which is typically the battery of the vehicle. The second tongue 63 is connected to the positive terminal of the battery, while the first tongue 62 is connected to the negative or ground terminal, in a manner to be described below.

With reference to FIG. 10, in a normal position N the heating plug 50 lies mostly within the sleeve element 41, and is held in position by the tongues 44. Its heating resistance is spaced away from the fingers of the pinch clip 46, so that no electrical circuit is established. When the button 51 is pushed in, the movable part of the heating plug is displaced axially so as to compress the return spring. The cup element of the heating resistance then forces the fingers of the pinch clip 46 apart, so that it passes between the lips of these fingers. An electrical circuit is then established through the pinch clip 46, the support of the heater element, the guide, the fire shield 53, the retaining tongues 44 and the sleeve element 41. The button is then in its pushed in, or heating, position indicated at C in FIG. 10.

The heating resistance then becomes heated, and the fingers of the pinch clip 46 dilate outwardly. At a predetermined temperature, the return spring acts so as to enable the cup element of the heating resistance to escape from the pinch clip. The plug 50 is then in its ejected position S (FIG. 10), so interrupting the electrical circuit. The user then only needs to extract the plug 50 in order to light a cigarette or cigar. Accordingly, the button 51 is arranged to occupy the three different positions N, S and C shown in FIG. 10. All of this is well known.

Figure 12:
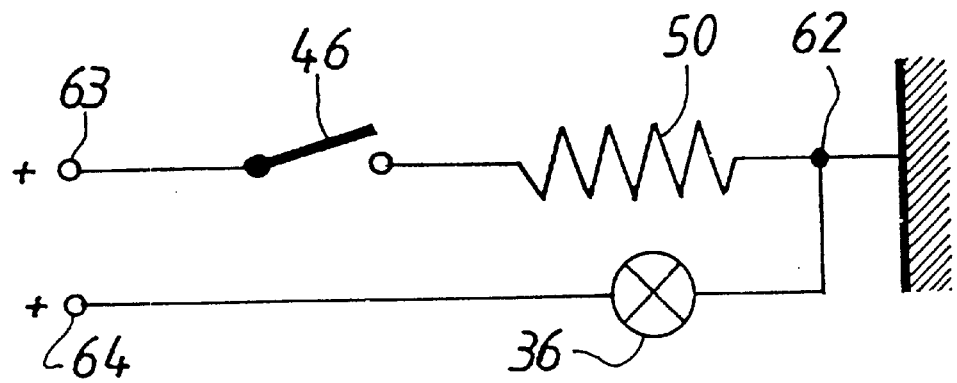
FIG. 12 is a diagrammatic view of the electrical circuit of the cigar lighter.

A corresponding electrical circuit is shown diagrammatically in FIG. 12. In FIG. 12, the pinch clip 46 is part of an interrupter, the other part of which consists of the heating plug 50, which is represented here by a simple resistance. When the button 51 is pushed in, the interrupter 46 is closed in order to heat the resistance 50. The interrupter is then opened when the pinch clip 46 dilates.

FIG. 12 also shows the power supply circuit for the illuminating lamp 36. This circuit includes a third electrical power supply member 64 which is arranged to be connected to the positive terminal of the battery via the main lighting switch of the vehicle. At night, when the lights of the vehicle are lit, the bulb 36 is also lit, and illuminates the ring 11 of the illuminating sleeve 10, so that the driver is able to see the cigar lighter, and can safely extract the plug 50 when required for lighting a cigar or cigarette, once the plug 50 is in its ejected position S. The connecting module 60 extends the lighter body 40 towards the rear, and is fixed on the latter.

Figure 13:
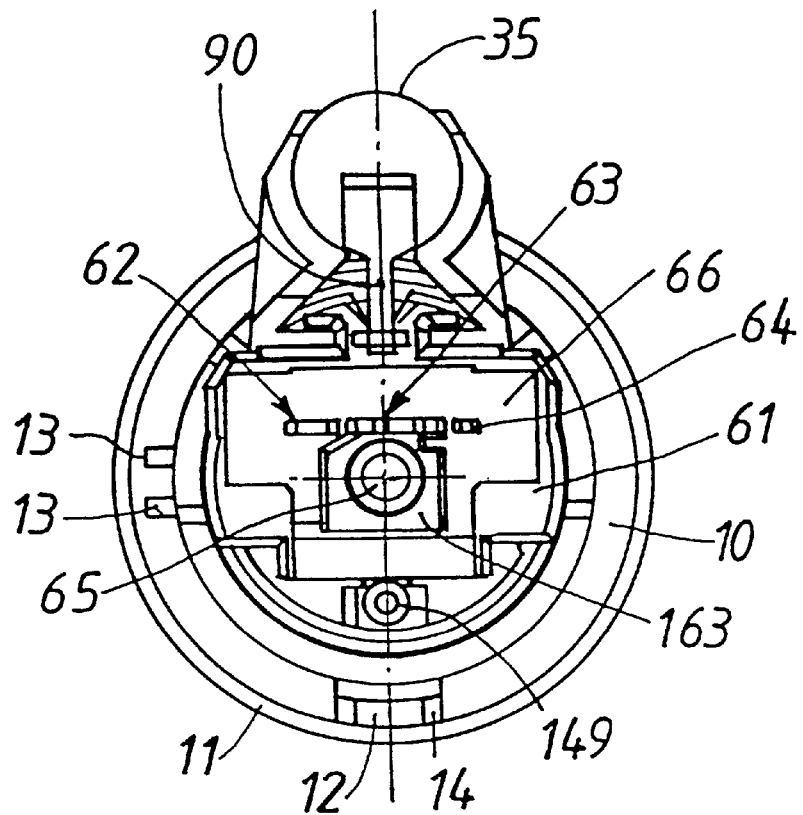
FIG. 13 is a view seen in the direction of the arrow 13 in FIG. 10.
Figure 14:
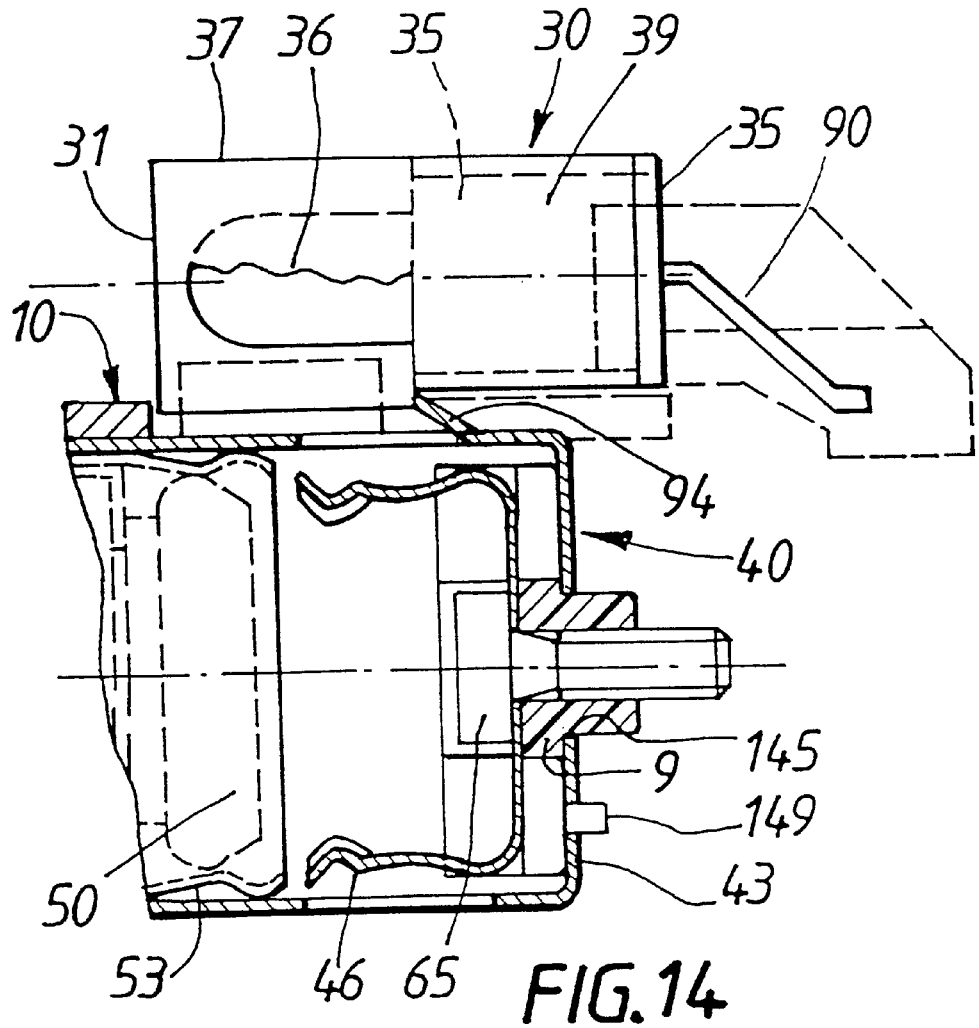
FIG. 14 is a partial view in axial cross section showing the interior of the lighter body, partly cut away so as to show the light source of the illuminating module, the rear part of which is shown in phantom lines so as to illustrate fourth and fifth electrical power supply tongues, the connection module being omitted.

In a manner known per se, the fastening means 65, 63 (FIG. 13) comprise the fastening member 65, also shown in FIG. 14, which passes through the base 43 of the sleeve element 41 (from which it is electrically insulated) so as to engage with the second electrical power supply member 63.

In general, the electrical power supply members 62 to 64 are of course electrically conductive. In this example, these components comprise suitably bent metallic tongues. All of these tongues, carried by the connecting module 60, include at least one axially oriented portion and a transversely oriented perpendicular portion. The axial portion will, for simplicity, be given the same reference sign as the tongue, and the transverse portion will be given the same reference sign increased by 100. The three members 62, 63 and 64 will be referred to for convenience as the first, second and third tongues respectively.

Figure 19:
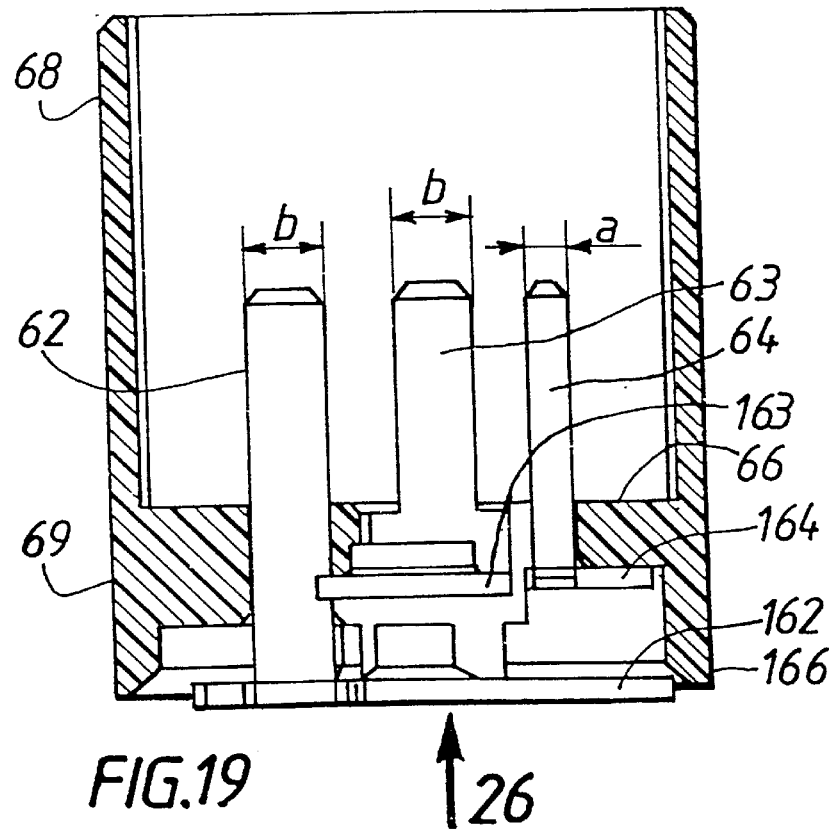
FIG. 19 is a view in cross section taken on the line 19—19 in FIG. 18.

As is best seen in FIG. 19, the width a of the axial portion of the third tongue 64 is smaller than the width b of the axial portion of the other two tongues 62 and 63. This arrangement provides a locating means, and arises from the fact that the first and second tongues 62 and 63 are such as to allow a current of high intensity to pass.

Figure 21:
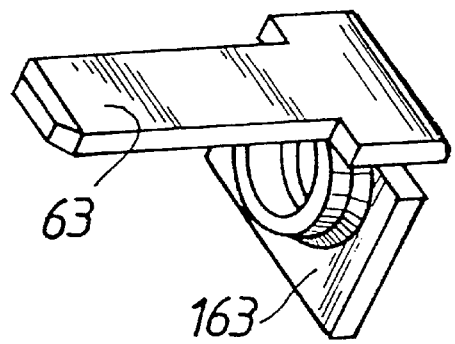

In the drawings, the second power supply tongue 63 has a transverse portion 163 which is wider than its axial portion, as can best be seen in FIG. 21. The transverse portion 163 therefore constitutes a nut for the fastening member 65, which is in the form of a screw, the head of which (FIG. 14) bears on the upper face of the base of the pinch clip 46 that faces towards the collar portion 42. The threaded portion of the screw 65 passes through the support bush 49, which is here of a mouldable plastics material, and through the base 43 and a transverse wall 66 (FIGS. 13 and 19) of a hollow connection body 61 (FIG. 4), that is to say the body of the connecting module 60. The wall 66 carries the power supply tongues 62 to 64, as can be seen for example in FIGS. 19, 23 and 24. The body 61 of the module 60 is of an electrically insulating material, in this case, again, a moldable plastics material.

The body 61 is so configured as to constitute the male part of a connecting device. It is on this body 61 that the body of an electrical power supply connector is mounted in a complementary way. In this case the connector 100 is of a female type associated with three electrical connecting wires 101 to 103 (see FIG. 10). The body of the female connector 100 is of electrically insulating material. It carries locking means with tongues, and female type sockets for receiving the complementary tongues 62 to 64. Each of these sockets is connected to a respective one of the wires 101 to 103, so that the tongues 62 to 64 can be connected to the battery and to the main lighting switch of the vehicle. The screw 65 then engages with the threaded nut incorporated in the second tongue 63, thus giving an assembly, of a known type, of the connecting module 60 and the base 43 of the lighter body.

The transverse portion 162 of the first tongue 62 is in direct electrical contact with the outer face of the base 43 of the sleeve element 41, and this contact extends over a large surface area. The axial portion of the tongue 62 extends through the transverse wall 66 (which will be referred to from hereon as the base portion 66, because it constitutes the base of the connector body 61). In the present case, the base portion 66 is spaced away from the front end of the body 61, as can be seen for example in FIG. 19. The front end of the body 61 is adjacent to the base 43 of the sleeve element 41 of the lighter body.

The transverse portions 162 and 163 of the tongues 62 and 63 respectively are arranged on either side of the base portion 66, so that the tongues 62 and 63 are insulated electrically. As can be seen in particular in FIGS. 13 and 25, the back face of the base portion 66 has a recess (not given a reference numeral) which is complementary in shape to the transverse portion 163 of the tongue 63, so as to be in mating cooperating with the second tongue 63, thus preventing rotation of the latter and retaining it in the axial direction.

The tongues 62 and 64 are immobilized against rotation and in the axial direction due to the fact that each of them extends through an axial passage in the base portion 66.

In a manner known per se, the support bush 49 has an axially projecting spigot 149 which extends through a hole 143 (FIG. 3) formed in the base 43 of the sleeve element 41, while a complementary hole (shown in FIG. 20 but not given a reference numeral) is formed in the transverse portion 162 of the tongue 62. The support bush 43 is thus prevented from rotating with respect to the sleeve element 41, and it prevents the first tongue 62 from rotating, the latter being itself immobilised against rotation with respect to the body 61.

Figure 3:
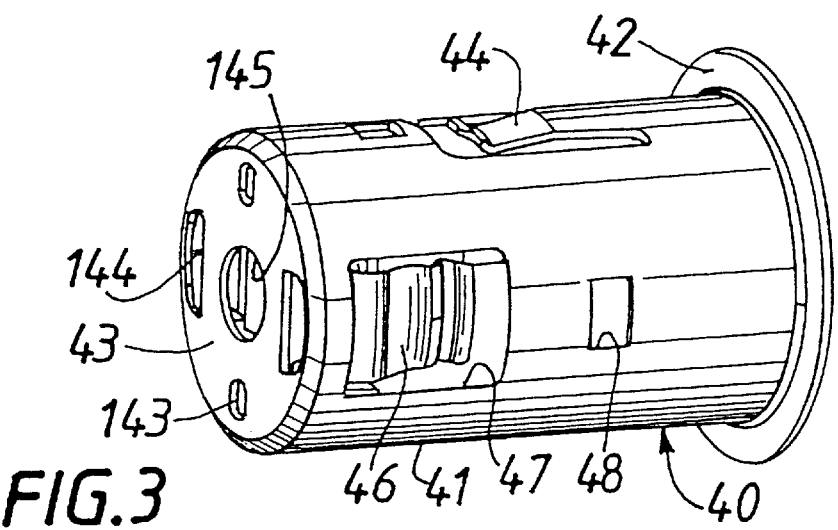

In order to complete the provisions for preventing rotation and in order to avoid the exertion of undue force on the root zone of the axial portion of the tongue 62, the base portion 66 has an axially projecting spigot (not shown) which engages in a complementary oblong aperture 144 formed, as shown in FIG. 3, in the base 43 of the sleeve portion 41. The connection body 61 is thus prevented from rotating with respect to the lighter body 40. The above mentioned spigot, the tongue 62 and the spigot 149 of the support bush 49 therefore constitute part of the fastening means 65, 63 mentioned above, acting between the connecting module 60 and the lighter body 40, given that the screw 65 and the second tongue 63 immobilise the connecting module 60 axially with respect to the lighter body 40.

In another version, the fastening member 65 may consist of a rivet or a bolt. In these cases, the portion 1 63 is not threaded.

Figure 4:
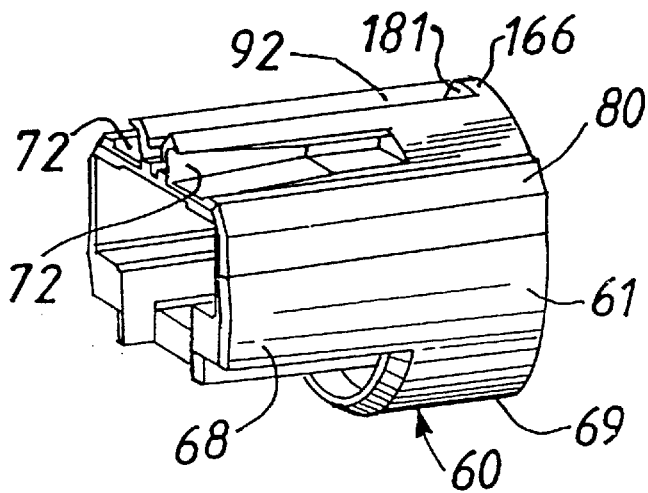
Figure 18:
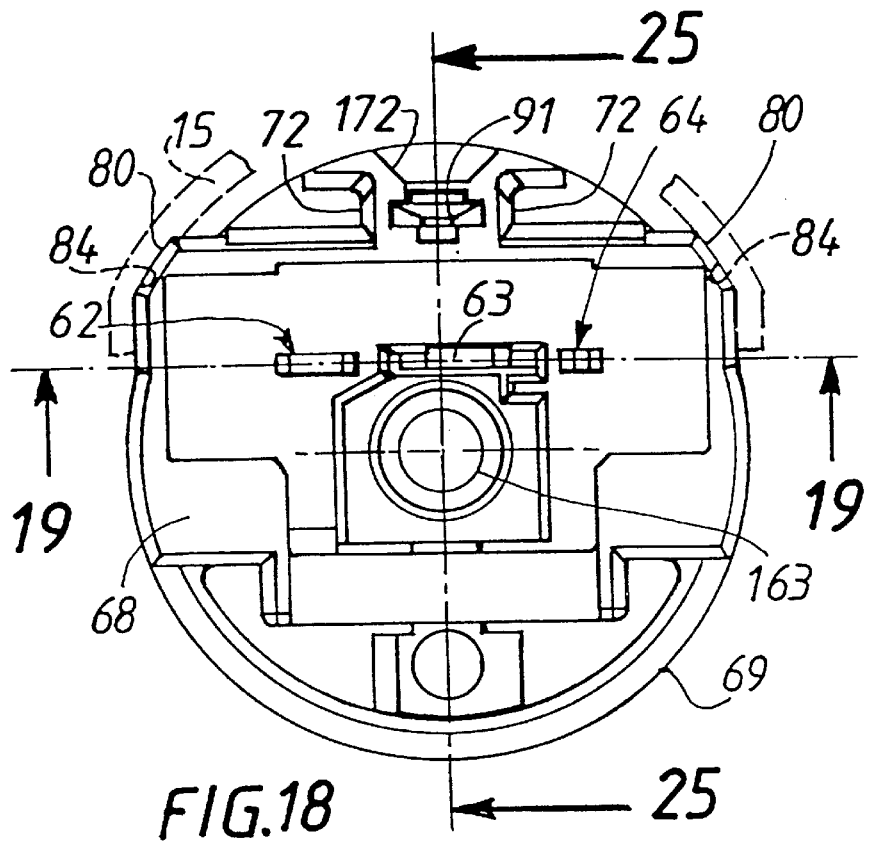
FIG. 18 is a view seen in the direction of the arrow 18 in FIG. 8, showing the rear of the connecting module, with part of the illuminating ring being shown in broken lines.

The connection body 61 has a generally cylindrical front portion 69, FIG. 4, which is extended outwardly by a generally T-shaped hollow rear portion 68 (see FIGS. 4 and 18). A cut-out is formed in the lower part of the body 61 between the front portion 69 adjacent to the base 43 of the sleeve element 41, and the rear portion 68 which is closer to the axial axis of symmetry of the cigar lighter.

The internal profile of the illuminating sleeve 10 is complementary to the external profile of the connection body 61, so that the illuminating sleeve 10 is able to be mounted by fitting it axially on the body 61, which lies within the overall contour of the sleeve element 41. The base portion 66 has a central circular hole for passage of the screw 65, and rectangular passages through which the axial portions of the tongues 62 and 64 pass. The base portion 66 is also formed with a recess for the spigot 149, and recesses for fitting the transverse portions 163 and 164 of the tongues 63 and 64 respectively, these being preferably in the same plane and arranged on either side of the base portion 66. A further opening is formed in the base portion 66 for the passage through it of an axially oriented connecting tongue 91 (FIG. 22) which is integral with the tongue 64. In this connection it will be noted that the connecting tongue 91 is wider than the axial portion of the tongue 64. The connecting tongue 91 is exposed externally, in a manner to be described later herein.

The base portion 61 is part of the front portion 69 of the connection body 61, being spaced away from the front end 166 of that portion, so as to be able to accommodate within it, with an axial offset, the transverse portions 162 to 164 of the tongues 62 to 64 respectively, thereby avoiding any electrical contact between the tongue 62 (which is the ground or earth tongue because it is arranged to be connected to the negative terminal of the battery), and the tongues 63 and 64 (which are positive tongues because they are arranged to be connected to the positive terminal of the battery).

It will be noted that the axial portions of the tongues 62 to 64 lie in the same axial plane, and that in this example they extend axially by the same distance from the rear face of the base portion 66 as shown in FIG. 19. The axial portions of the first and third tongues 62 and 64 are disposed on either side of the axial portion of the second tongue 63. The connecting tongue 91 is disposed generally radially outwards of the axial portion of the first tongue 62, as seen in FIG. 18.

Figure 20:
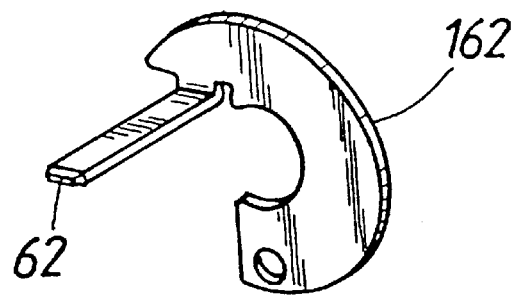
FIGS. 20 to 22 are perspective views showing the first, second and third electrical power supply tongues respectively.

The front face of the base portion 66 carries the axially projecting spigot associated with the blocking aperture 144 (FIG. 3), and also carries two radial ribs (FIG. 26) which join a central sleeve portion to an annular skirt portion 166, oriented axially, which constitutes the front end of the connection body 61. The sleeve portion and ribs are also carried by the base portion 66. The skirt portion 166 is chamfered at the front. The central sleeve portion is arranged to receive a central centering nose (FIG. 14) in the form of a chimney of the support bush 49 for the pinch clip 46, this chimney extending through the central aperture 145 in the base 43 of the sleeve element 41. Thus, the screw 65 extends through the base 43, from which it is electrically insulated, and is unable to make contact with the first tongue 62, the transverse portion 162 of which is in the form of a ring, as shown in FIG. 20, that extends over a little more than 180 degrees and has at one of its circumferential ends the hole through which the spigot 149 passes. At its other circumferential end is the root zone of the axial portion of the tongue 62 by which the lighter body 40 is grounded, and which extends at right angles to the transverse portion 162 of that tongue. Because of this, the spigot 149 does not interfere with the tongue 62, which is in engagement through its transverse portion 162 against the chamfer of the annular skirt portion 166, the ribs and the sleeve portion, being centered by the annular skirt portion 166. The transverse portion 164 (FIG. 22) of the tongue 64 is generally in the form of a tight arc of a circle joining the axial portion of the tongue 64 to the axial connecting tongue 91.

Figure 22:
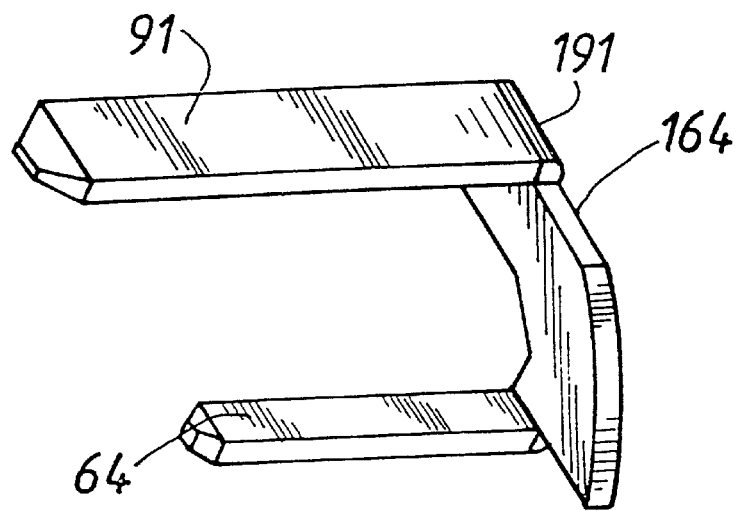
Figure 23:
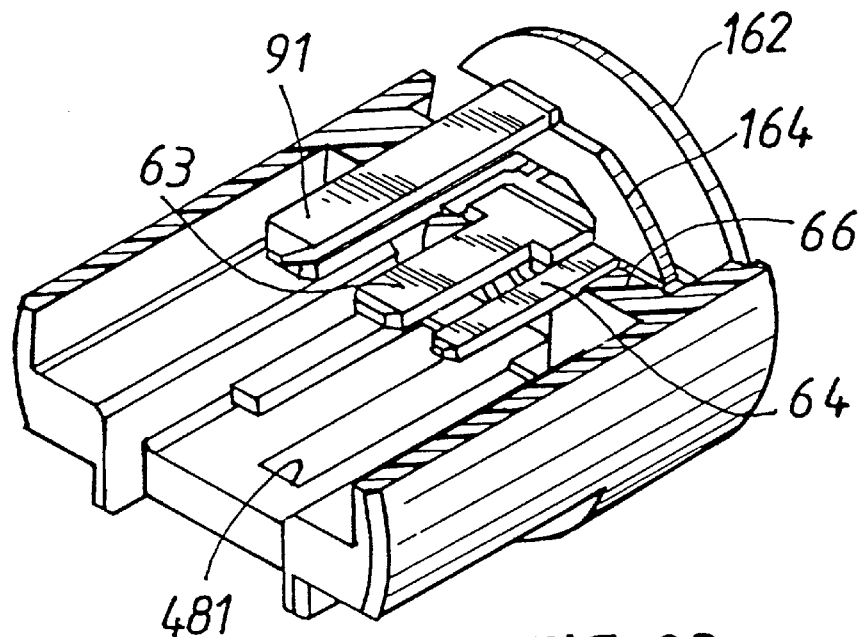
FIGS. 23 and 24 are perspective views, with the body of the connecting module partly cut away in order to show the three electrical power supply tongues carried by the connecting module.

These axial portions consisting of the tongues 64 and 91 are integral with each other as shown in FIG. 22, but they are offset circumferentially and radially and are of different widths.

Figure 26:
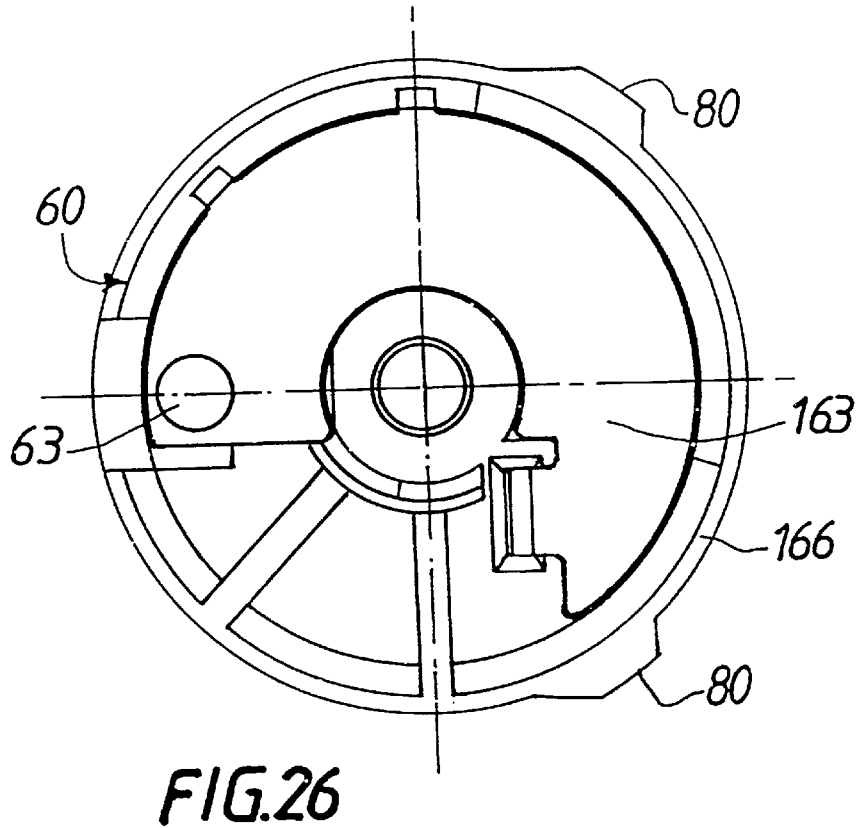
FIG. 26 is a view seen in the direction of the arrow 26 in FIG. 19.

Thus, the transverse portions 162 and 164 of the first and third tongues 62 and 64 respectively are insulated electrically from each other, and are offset axially from each other due in particular to the ribs and sleeve portion seen in FIG. 26.

Because of the various passages and openings provided, the connection body 61 constitutes with the tongues 62 to 64 a unitary assembly which cannot be lost. The rear portion 68 of the body 61 has two inclined, axially oriented ribs (see for example FIGS. 4, 18 and 26), which are oriented axially and which are parallel to each other, extending to the end of the front portion 69 of the body 61. These ribs 80 extend over the whole length of the body 61 as shown in FIG. 4, and have a form complementary to that of the grooves 84 shown in FIG. 18, the latter being also oriented axially and parallel to each other. The ribs 80 therefore engage in the grooves 84 in the manner of a drawer. The ribs 80 are located in the region of the edges of the horizontal element of the T defined by the rear portion 68 of the body 61. The rear portion 68 thus has two chamfers at its top. The ribs 80 project radially with respect to the sleeve portion 41. The skirt portion 166 (and therefore the front portion 69) have the same diameter as the sleeve portion 41.

In another version, the diameter of the sleeve portion 41 may be slightly greater than that of the front portion 69.

The upper, or horizontal, portion of the T defined by the rear portion 68 carries two radially outwardly projecting blind slide elements 72 which extend as far as the front portion 69 of the body 61. These slide elements 72, which define grooves of generally U-shaped cross section, are oriented axially and are separated from each other by an axial passage 92 which extends to the skirt portion 166 defined by the base 66. The connecting tongue 91 is engaged in this passage 92, which extends into the front portion 69 of the body 61.

It will be noted that there is a gap 81 (FIG. 24) between the tongue 91 and the skirt portion 166, and that the passage 92 is bounded by the axially oriented base surfaces of the slide elements 72 and by the upper branches of the slide elements.

Each of these upper branches is extended towards the other branch and towards the other slide element by an inclined lip. This defines two chamfers and a further guiding slide element 172 having inclined sides or flanks which are constituted by the chamfers. The guiding slide element 172 is longer in the axial direction than the slide elements 72. In each of the side elements 72, there is engaged a bar portion 70 (see FIG. 6), which is described below and which is part of the rear portion 71 of the cap element 37 of the illuminating module 30.

The rear portion 71 is ribbed in this example, and consists of knee elements, or knees, 71 that extend parallel to each other below the middle portion 39, together with wing elements 38 of the cap element 37 (FIG. 7). These knees 71 together define, in their upper part as shown in FIGS. 6 and 13, a tubular passage which enables the lamp carrier sleeve 35 to be fitted into the middle portion 39. This tubular passage is extended radially inwardly by an axially oriented passage through which the fourth power supply tongue 90 can pass.

The internal passage is bounded for each knee 71 by an inclined wall which terminates in the corresponding transverse bar portion 70 which is parallel to the top wall of the T of the rear portion 68 of the body 61. Each bar portion 71 is oriented axially and is so configured as to engage for sliding movement in a corresponding one of the slide elements 72. Thus a dovetail device is formed, with a vertical web 171 joining the front end of each bar portion 71, and each inclined wall, to the main part of the knee 71.

An electrically conductive fifth tongue 94, for supplying power to the bulb 36, extends away from the cap element 37 so as to make direct contact with the sleeve element 41 in contact with the transverse tongue portion 162. This fifth tongue 94 is therefore connected to the first tongue 62 and thence to ground. Thus both of the tongues 62 and 94 are earth tongues. The tail portion 15 of the sleeve 10 has a hole to allow the tongues 90 and 94 to pass through it so as to supply power to the bulb 36. This hole is closed in the drawings. In another version, the hole may be open at the rear of the tail portion.

Thanks to all these arrangements, there is no need to provide a specific connector for the purpose of connecting the fourth electrical power supply tongue 90 to the positive terminal of the battery. In this connection, the fourth tongue 90 is arranged to cooperate with the connecting tongue 91 which is part of the power supply member, or third tongue, 64.

Thus, both the lighter body 40 and the light bulb 36 can be supplied with power at the same time using the connecting module 60 with its three tongues 60 to 64, which is thus a three-way connector. The module 60 in this example is of the hybrid type, because the tongues 62 and 63 are not of the same width as the tongue 64. This enables the cigar lighter to be made inexpensively.

It will be appreciated that the knees 71 and the dovetail assembly between the bar elements 70 and the slide elements 72 enables good electrical contact to be obtained between the tongues 91 and 90. In this connection, because of the slide elements and bar elements 70, the tongue 90, which is inclined, will remain in contact with the connecting tongue 91, being mounted under a prestress.

It will be appreciated that the chamfers of the slide elements 72, and therefore the slide element 172 also, facilitate the fitting on the connecting body 61, by axial insertion, of the assembly consisting of the illuminating sleeve 10 and the illuminating module 30, without risk of any damage occurring in the tongue 90, which will automatically come into contact with the connecting tongue 91 during this insertion operation. More precisely, the ribs 80 and the grooves 84 are part of the temporary locking means 80 to 84, and prevent any relative rotation occurring between the connecting body 61 and the illuminating sleeve 10. The radially inwardly projecting lug 83 in FIG. 17, formed on each of the tongues 12 of the illuminating sleeve 10, are located close to the ring portion 11. Each of these lugs 83 has a profile (considered in the axial direction) which is generally in the form of a trapezium, having a minor base and a major base defined by the tongue 12. Considered circumferentially, the lug 83 also has a cross section in the form of a trapezium, with two inclined sides having a form complementary to that of the chamfers of the slide elements 72 which define the guiding slide 172. The lugs 83 therefore have the general form of a truncated pyramid.

While the sleeve 10 is being slid axially over the body 61, the ribs 80 come into engagement with the grooves 84, while the tongue 12 concerned comes into engagement, through its lug 83, with the chamfers of the slide elements 72. The movement is continued until the lug 73 falls into the gap 81 (FIG. 24) in the module 60, and comes into abutment against an inclined face 181 of the wall of the skirt portion 166 of the body 61. The situation is then as shown in FIGS. 8 and 9, with temporary locking, and therefore temporary coupling, of the illuminating sleeve 10 on the body 61 prior to fitting of the cigar lighter on the fixed wall 20 of the vehicle. In this position, the total length of the cigar lighter is $D_2$, with a distance $D_1$ existing between the rings 52 and 11. The magnitude of $D_2$ is more than twice that of $D_1$, which in this example is less than the length of the assembly consisting of the illuminating sleeve 10 and the illuminating module 30.

The situation in FIGS. 8 and 9 corresponds to the delivery condition of the cigar lighter, before the latter is fitted on the facial 20 of the vehicle. It will be noted that a unitary assembly is delivered, and that the fifth tongue 94 is protected.

For fitting on the wall 20, the male connector 100 is extracted by bringing it through the aperture 21 in the wall 20. The connector 100 is fitted and connected on to the body 61. The cigar lighter is then tilted, so that it can be fitted obliquely, i.e. on a slant, into the hole 21 so that the projecting illuminating module 30 will be able to pass through the wall 20. The cigar lighter is then straightened up so as to be level, and so that the ribs 30 will fall into the notch 22. Finally, a pushing force is exerted on the body 40 so that the latter can enter into the sleeve 10. During this motion, the connection body 61 is displaced with respect to the sleeve 10 and with respect to the illuminating module 30, with the knees 71 coming into engagement, through their bar portions 70, with the slide elements 72, while the tongues 90 and 94 come into engagement, and therefore electrical contact, with the tongue 91 and the sleeve element 41 respectively.

This movement is continued until the collar portion 42 makes contact with the ring portion 11.

This assembly operation is preferably carried out by pushing on the ring 52 of the heating plug 50. This is possible because of the temporary locking means comprising the grooves 84, the ribs 80, the tongues 12 and the hole 81, the attachment means 31 to 34, and the assembly means 70 to 72, with the electrical connection being made automatically because of the electrical connecting means comprising the tongues 90 and 91.

In this connection, the axially oriented tongues 12 temporarily retain, through their lugs 83, the sleeve 10 axially on the connecting body 61, in such a way that the sleeve 10 is locked axially on the body 61 in a retractable way. Any relative rotation is prevented by the ribs 80 and the grooves 84, which together constitute a locating means. It will be noted (see FIG. 4) that the hole 81 is delimited firstly by the above mentioned inclined face 181, and secondly by the connecting tongue 91, and more precisely by the rounded root zone 191 of the connecting tongue 91 where it joins the transverse portion 164 of the third tongue 64. The hole 81 extends in the skirt portion 166 and is delimited by the front axial end of the slide 172 which is open at the rear. The axial end of the slide 172 thus consists of the inclined face 181. It will be noted that the lug 83 of the tongue 12 is conditioned by this.

Thus, with reference to FIG. 17, the lug 83 has in its lower part a front axial face which is convex for cooperation with the inclined face 181, while at the rear end it has a concave face for cooperation with the rounded zone 191 of the connecting tongue 91, which therefore has a supplementary function of axial retention of the concave tongue 12.

Figure 24:
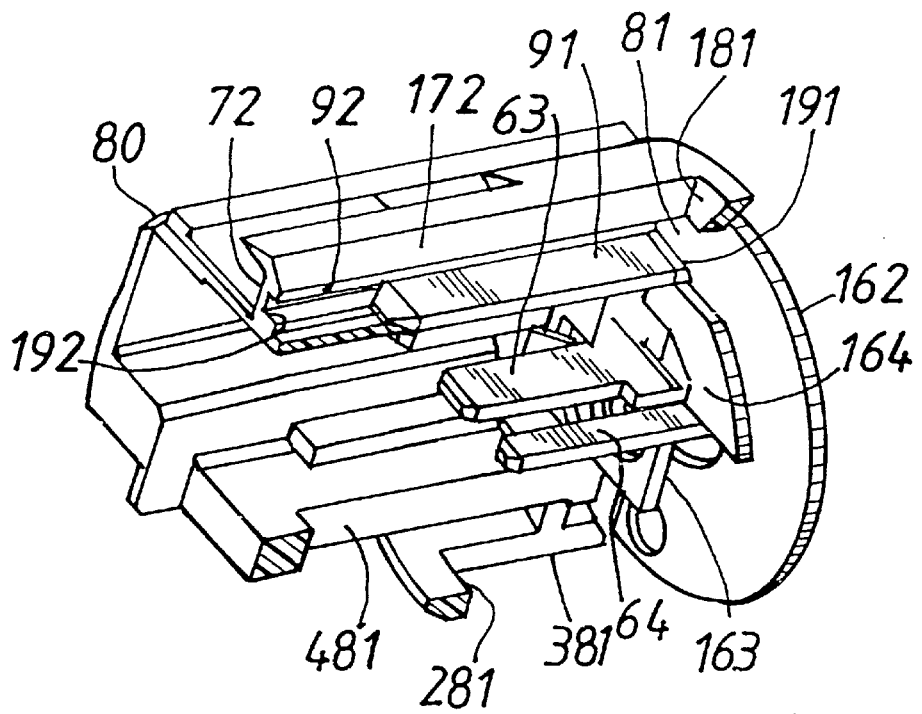
Figure 25:
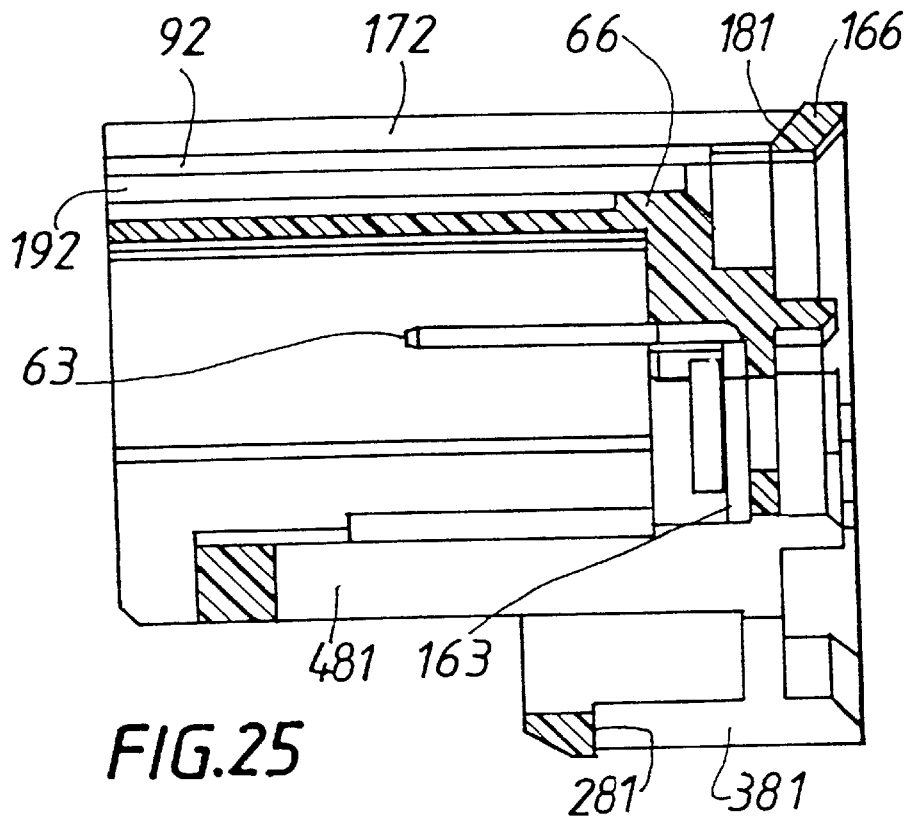
FIG. 25 is a view in cross section taken on the line 25—25 in FIG. 18, with the electrical connecting tongue and the third tongue omitted.

With reference to FIG. 24, it can be seen in the lower part of this Figure that there is a hole 381 formed in the front portion 69 diametrically opposed to the hole 81 and delimited by a circumferential edge 281. The other tongue 12 cooperates, through its concave rear face, with the edge 281 so as to retain the sleeve 10 axially in one direction. The hole 381 is wider in the circumferential direction than the tongue, and also serves for clipping the connector 100 in position.

The attachment means 31 to 34 prevent the cap element 37, and therefore the module 30, from escaping from the sleeve 10, while the knees 71 enable the tongues 91 and 90 to be properly positioned by putting the tongue 90 under stress due to the slide elements 72.

It will be noted that, after fitting, any relative rotation between the lighter body 40 and the sleeve 10 is prevented. In this connection, the sleeve 10 is located in the rotational sense by the ribs 13 engaging on the wall 20. By virtue of its axial lugs 33 and its slot 34, the sleeve 10 provides a coupling with the cap element 37, especially in rotation, while the knees 71 provide rotational coupling between the cap element 37 and the body 61. Thus, the lighter body 40 and the body 61 are prevented from rotating by the cap element 37, which therefore has a double function due to its wing elements 38 and knees 71. The cap element 37 forms a bridge between the sleeve 10 and the connection body 61.

It will be noted that the rear portion 68 of the connecting module 60 has a slot 481, while its front portion 69 has a hole, namely the above mentioned hole 381, which are diametrically opposed to the hole 81 and tongue 91 respectively, so as to provide a double clipping arrangement for the connector 100.

It will be appreciated that the sleeve 10, the cap element 37 and the connection body 61 are inexpensive components easily made by moulding.

The illuminating sleeve 10 is not greatly modified as compared with a standard sleeve, because it only differs from the latter in respect of the grooves 84 and lugs 83.

The cap element 37 is also not greatly modified, because it is sufficient to add the knees 71, which preferably mask the fourth tongue 90, thus ensuring protection of the latter when the cigar lighter is in its condition for delivery.

The connection body 61 is characterised by the form of the slide elements 72, forming together a guiding slide 172 for the axially oriented tongue 12 of the sleeve 10, which is thus protected and runs no risk of being twisted. Other features are the passage 92 and the hole 81.

All of the foregoing can be achieved easily and inexpensively.

The first tongue 62 has a good zone of contact with the base 43 of the sleeve element of the lighter body, due to the form of the transverse portion 162. The third tongue 64 is easy to make.

All of these arrangements enable a powerful cigar lighter to be constructed, capable of supporting a high current.

It will be appreciated that the sleeve 10 does not completely surround, and therefore does not completely mask, the lighter body 40 when the cigar lighter is fitted on the fixed wall. It can be seen in FIG. 10 that the apertures 47 and the fingers of the pinch clip 46 are not surrounded by the sleeve 10, which is therefore shorter than the body 40 at this level. This facilitates the inclined introduction of the sleeve 10 and cap element 37 through the wall 20.

The lighter body 40 is of a standard type, but in another version it may include a masking sleeve which surrounds the lighter sleeve element 41 so as to mask the apertures 47 and the fingers of the pinch clip 46, thereby avoiding the possibility of any wire touching the pinch clip, having regard to the environment in which the cigar lighter is fitted. In that case, the illuminating sleeve is mounted on the masking sleeve.

It is of course possible to provide a fuse in the electrical circuit for the cigar lighter. For example, a fuse can be fitted in the region of the pinch clip, the fuse operating in the manner of a diode with a very high resistance in the event of overheating of the heating resistance, or in the event of an excess current, so that the current supply element does not necessarily have to be a pinch clip or two-fingered clip, such as the clip 46.

It will be noted that the presence of the lugs cooperating with the apertures 48 in the sleeve element 41 is not essential, because the lugs 83 provide good gripping of the sleeve element 41.

As will have been understood, the body 61 of the connecting module has an axially oriented projecting element 200 which is bounded laterally by the two slide elements 72 and, at the top, by the slide element 172, with its inclined sides or flanks constituted by the inclined lips in the manner described above. The passage 92 defines the open base of the slide element 172. The said projecting element 200 defines at its base a channel 192, with a rectangular cross section which is open outwardly through the passage 92. It is in this channel 192 that the connecting tongue 91, wider than the tongue 64, is force fitted. The channel 192 serves to accommodate the tongue 91, being longer than the latter. The tongue 90 is therefore narrower than the tongue 91, so that it can penetrate into the passage 92.

It will be noted that the grooves 72 are divergent at the rear end of the body 61 of the connecting module, so as to facilitate introduction of the bar portions 70 of the knees 71.

As will have been understood, the lugs 83 have generally the form of a trapezium with a truncated apex.

The ribs 80 which constitute axial projections are engaged in the complementary axial grooves 84. The ribs 80 and grooves 84 have a trapezoidal form, with the ribs 80 being constituted by the chamfered edges of the top part of the T defined by the rear portion 68 of the body 61.

The projecting element 200 consists of the combination of the slide elements 72 and 172 with the channel 192 at its base.

The connecting module 60 can of course include two connection ways constituted by the first and second tongues 62 and 63 for the electrical power supply to the lighter body 40. In that case, the fourth tongue 90 extends axially so as to be connected on a specific connector. This arrangement is of course of less advantage than that described above and shown in the drawings. Again, although of less advantage, it is It can be seen the to omit the knees 71.

It can be seen that the hole 81 is not necessarily bounded by the connecting tongue 91. It can be bounded by the face 181 and the material of the body 61 of the connecting module 60.

The hole 81 may of course be a simple hole, with the slide element 172 then being omitted.

As will be clear from the foregoing description and the drawings, the body 61 of the connecting module 60 has at least one housing 81, 381 for the lug 83 of a tongue 12, so that the illuminating sleeve 10 is prefitted, before delivery, by snap-fitting on the body 61 and therefore on the assembly consisting of the lighter body 40 and the connecting module 60, with the lug 83 of a tongue 12 cooperating with at least one edge of the said housing. The housing 81 or 381 may consist of a hole through the outer periphery of the body 61 as in the drawings, or, in another version, it may consist of a recess which involves forming a blind hole. It is of course possible to combine both these arrangements, with the body 61 having a hole 61 or 381 and a blind hole for receiving the lugs 83 of the tongues 12.

It will be noted that in the drawings, the hole 81 is formed in the summit slide element 172, being bounded laterally by the inclined flanks of the latter and the edges of the channel 192 which is open through the passage 92.

The slot 481 is oriented axially and is narrower than the hole 381. This slot 481 enables the lug of the tongue 12 to be guided, with the circumferential or lateral edges of the lug 83 cooperating with the longitudinal edges of the slot. The rear end of the front portion 69 of the body 61 is chamfered, which facilititates introduction of the lug 83 into the hole 381.

The inclined face 181 of the hole 81 enables the tongue 12 to be deployed radially outwardly. In general terms, when the cigar lighter is mounted on the fixed wall 20, the tongues 12 are deployed radially outwardly as compared with their temporary locking position on the hollow body 61 for accommodating the tongues 62 to 64 and 91.

As described above, the body 61 projects axially with respect to the tongues 62 to 64. In another version, however, the axial portions of the tongues 62 to 64 project axially with respect to the body 61.

The temporary locking means for the illuminating sleeve 10 on the connection module 60 may of course be in a different form from that described above. For example, a tongue may be arranged on the connecting module, which will then be received in a housing of the illuminating sleeve.

What is claimed is:

1. A lighter mountable on a wall with a mounting aperture therein, the lighter comprising:

a heating plug;

a lighter body adapted to receive heating plug removably;

an illuminating sleeve surrounding the lighter body, the illuminating sleeve including means for fastening the lighter body in the mounting aperture;

an illuminating module carried by the illuminating sleeve, the illuminating module including a light source for supplying light to the illuminating sleeve;

a connecting module fixed on the lighter body for supplying power to the lighter body;

first locking means, carried by the illuminating sleeve, for locking the illuminating sleeve to the wall, the first locking means comprising an axially oriented locking tongue; and second locking means, interposed operatively between the illuminating sleeve and the connecting module, for effecting disconnectable temporary connection of the illuminating sleeve to the connecting module.

2. The lighter according to claim 1, wherein the second locking means and one of the illuminating sleeve and the connecting module include a locking tongue.

3. The lighter according to claim 2, wherein the locking tongue of the second locking means is the locking tongue of the first locking means, the locking tongue having a free end defining a radially inwardly projecting lug.

4. The lighter according to claim 3, wherein the lug has an axial cross section generally defining a trapezoidal profile.

5. The lighter according to claim 3, wherein the lug has a trapezoidal circumferential cross section.

6. The lighter according to claim 3, wherein the lug is generally in the form of a truncated pyramid.

7. The lighter according to claim 3, wherein the connecting module comprises an electrically insulating connection body having a hole for receiving the lug, the second locking means including the hole.

8. The lighter according to claim 7, wherein the first locking means comprises two diametrically opposed locking tongues, each of the tongues formed with a lug and adapted to penetrate into the hole in the connection body of the connecting module.

9. The lighter according to claim 1, wherein the illuminating sleeve has an internal axial groove, the connecting module having an axially projecting element complementary to the grove and adapted to penetrate into the groove.

10. The lighter according to claim 9, wherein the groove and the projecting element have a generally trapezoidal form.

11. The lighter according to claim 10, further comprising two grooves and two complementary projecting elements, the insulating body of the connecting module having a T-shaped summit portion defining chamfered edges, each of the projecting elements comprising a chamfered edge.

12. The lighter according to claim 3, wherein the connecting module has a body of insulating material and an axially oriented slide complex carried by the body, the slide complex having a summit defining a first slide element with an open base defining a passage.

13. The lighter according to claim 12, wherein the slide complex includes two axially oriented second slide elements, the second slide elements being guide elements bounding the slide complex laterally, the slide complex further defining a channel having a rectangular cross section which is open outwardly through the base of the first slide element, the channel bounding the slide complex at a bottom.

14. The lighter according to claim 13, wherein the first slide element has inclined flanks for cooperation with the lug of the locking tongue.

15. The lighter according to claim 13 for a vehicle having a voltage source with a positive pole and another pole connected to ground, wherein the connecting module comprises a three-way connector having:

a body;

a first tongue for connecting to ground;

a second tongue for connecting to the positive pole;

a third tongue, carried by the body of the connecting module, for connecting to the positive pole; and a connecting tongue integral with the third tongue.

16. The lighter according to claim 15, wherein the third tongue is narrower than the first and second tongues.

17. The lighter according to claim 16, wherein each of the first, second and third tongues has a transverse portion, the transverse portion of the first tongue having a generally semi-annular form offset axially and circumferentially with respect to the transverse portions of the second and third tongues.

18. The lighter according to claim 17, wherein the lighter body comprises a body element, a pinch clip within the body element, and means insulating the pinch clip electrically from the body element, the transverse portion of the second tongue defining a threaded nut, the connecting module further including a screw having a head, the screw adapted to screw into the nut with the head bearing against the pinch clip, with the transverse portion of the third tongue connecting the third tongue and the connecting tongue.

19. The lighter according to claim 18, wherein the body element of the lighter body is an electrically conductive sleeve element having a base, the base of the sleeve element being in contact with the first tongue, the illuminating module further including a fourth tongue for connecting the illuminating module electrically with the connecting tongue, and a fifth tongue for connecting the illuminating module electrically with the sleeve element, the transverse portion of the third tongue having the form of a circular sector for connecting the connecting tongue to the third tongue.

20. The lighter according to claim 13, wherein the illuminating module further includes two knee portions for connecting the illuminating sleeve to the connecting module, each knee portion comprising a bar portion, each bar portion being engaged in the second slide element of the slide complex.

21. The lighter according to claim 20, wherein the second slide element defines a U-shaped profile divergent towards the rear of the connecting module.

22. A vehicle including the lighter according to claim 1.

23. A method of mounting the lighter according to claim 1 onto the wall with the mounting aperture, the lighter being assembled with the second locking means effecting a temporary connection of the illuminating sleeve to the connecting module at a temporary locking position, the method comprising the steps of:

connecting the connecting module of the assembled lighter to a power supply;

inserting the assembled lighter through the mounting aperture so that the wall is positioned between a collar portion of the illuminating sleeve and the illuminating module; and pushing the lighter body of the assembled lighter to cause the locking tongue to move from the temporary locking position to a final locking position, wherein the illuminating sleeve is locked on the wall.

* * * * *